US010651698B2

United States Patent
Takashima et al.

(10) Patent No.: US 10,651,698 B2
(45) Date of Patent: May 12, 2020

(54) ROTOR OF ROTARY ELECTRIC MACHINE, ROTARY ELECTRIC MACHINE, AND ROTOR MEMBER OF ROTARY ELECTRIC MACHINE

(71) Applicant: Mitsubishi Electric Corporation, Tokyo (JP)

(72) Inventors: Yoshiharu Takashima, Tokyo (JP); Yoshiki Okada, Tokyo (JP); Masafumi Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 746 days.

(21) Appl. No.: 15/502,908

(22) PCT Filed: Jan. 26, 2016

(86) PCT No.: PCT/JP2016/052187
§ 371 (c)(1),
(2) Date: Feb. 9, 2017

(87) PCT Pub. No.: WO2017/130295
PCT Pub. Date: Aug. 3, 2017

(65) Prior Publication Data
US 2018/0054100 A1    Feb. 22, 2018

(51) Int. Cl.
*H02K 1/28*    (2006.01)
*H02K 1/27*    (2006.01)
*H02K 1/30*    (2006.01)

(52) U.S. Cl.
CPC .............. *H02K 1/278* (2013.01); *H02K 1/28* (2013.01); *H02K 1/30* (2013.01)

(58) Field of Classification Search
CPC ............. H02K 1/278; H02K 1/28; H02K 1/30
(Continued)

(56) References Cited

U.S. PATENT DOCUMENTS 6,047,461 A    5/2000    Miura et al.
9,413,199 B2    8/2016    Arimatsu
(Continued)

FOREIGN PATENT DOCUMENTS

DE    2048643 C    8/1972
DE    7433645 U    1/1975
(Continued)

OTHER PUBLICATIONS

International Search Report of PCT/JP2016/052187, dated Apr. 26, 2016 (PCT/ISA/220 and PCT/ISA/210).
(Continued)

*Primary Examiner* — Terrance L Kenerly
(74) *Attorney, Agent, or Firm* — Sughrue Mion, PLLC; Richard C. Turner

(57) ABSTRACT

A rotor includes a tubular sleeve member, a plurality of permanent magnets aligned in a peripheral direction on an outer peripheral surface of the sleeve member, and a tubular reinforcing member covering an outer peripheral surface of the permanent magnets. The sleeve member includes first and second end portions, which are spaced apart from each other in an axial direction, and an inner peripheral surface forming a through hole that is parallel to the axial direction and through which a shaft passes. The first end portion is a flange portion. The inner peripheral surface includes a first tapered surface, an inner diameter of which is continuously reduced toward the second end portion from the first end portion, and a tapered surface, an inner diameter of which is continuously reduced toward the end portion from the second end portion.

19 Claims, 16 Drawing Sheets

(58) Field of Classification Search
USPC .................................................. 310/156.12
See application file for complete search history.

(56) References Cited

U.S. PATENT DOCUMENTS

| 2014/0300233 A1 | 10/2014 | Arimatsu |
| 2015/0188369 A1 | 7/2015 | Arimatsu |

FOREIGN PATENT DOCUMENTS

| DE | 102008006489 A1 | 7/2009 |
| DE | 102014119131 A1 | 7/2015 |
| JP | 2000-245086 A | 9/2000 |
| JP | 2003-111327 A | 4/2003 |
| JP | 3484051 B2 | 10/2003 |
| JP | 3484051 B2 | 1/2004 |
| JP | 2004208356 A | 7/2004 |
| JP | 2009-148864 A | 7/2009 |
| JP | 4377325 B2 | 12/2009 |
| JP | 2014212680 A | 11/2014 |
| JP | 5689550 B2 | 3/2015 |
| SU | 1208351 A | 1/1986 |
| WO | 2004/008612 A1 | 1/2004 |

OTHER PUBLICATIONS

Communication dated Oct. 9, 2018, issued by the State Intellectual Property Office of People's Republic of China in counterpart Application No. 201680002240.2.

Niemann, "Maschinenelemente," vol. 1, 1981; Konstruktion and Berechnung von Verbindungen, Lagern, Wellen, 2nd edition, Springer Verlag 181, (pp. 361, 368-370) 7 pages total.

Kollmann, "Welle-Nabe-Verbindungen", Gestaltung, Auslegung, Auswahl, Springer-Verlag, 1984, (pp. 91 et seq. and 105 et seq.) 10 pages total.

Communication dated Sep. 26, 2017 from the German Patent and Trademark Office in counterpart application No. 112017000001.7.

Communication dated Apr. 5, 2018, issued by the Korean Intellectual Property Office in corresponding Korean Application No. 10-2017-7003509.

ed No. 2014-212680
ROTOR OF ROTARY ELECTRIC MACHINE, ROTARY ELECTRIC MACHINE, AND ROTOR MEMBER OF ROTARY ELECTRIC MACHINE

CROSS REFERENCE TO RELATED APPLICATIONS

This application is a National Stage of International Application No. PCT/JP2016/052187 filed Jan. 26, 2016, the contents of all of which are incorporated herein by reference.

FIELD

The present invention relates to a rotor of a rotary electric machine, a rotary electric machine that includes the rotor, and a rotor member used in the rotor.

BACKGROUND

The need for high-efficient, high-output, and high-rotation-speed rotary electric machines for industrial applications has been increasing tremendously in response to the need to save energy in light of depleting resources, shortening of machining takt times, or machining of materials that are difficult to machine.

Rotary electric machines are classified into two driving systems: "synchronous" systems and "inductive" systems. Inductive rotary electric machines are often used as rotary electric machines for industrial applications due to their rigidity and strength. However, with inductive rotary electric machines, in principle, current also flows through the rotors. This current generates heat in the rotors, which is a problem in terms of increasing the efficiency and the output of the rotary electric machines. Thus, the use of synchronous rotary electric machines for rotary electric machines for industrial applications is now progressing.

Synchronous rotary electric machines use permanent magnets for generating electric fields in rotors; therefore, in principle, heat is not generated in the rotors, which is advantageous in terms of increasing the efficiency and the output of the rotary electric machines. However, to actually increase the rotational speed of synchronous rotary electric machines, it is necessary to address the problem of separation of the magnets due to the centrifugal force generated during rotation.

A rotary electric machine disclosed in Patent Literature 1 has a structure that prevents such a magnet separation. Specifically, in the rotary electric machine, a plurality of permanent magnets are disposed on the outer peripheral surface of a tubular sleeve member that is fixed to the shaft and the permanent magnets are covered with a protective cover made of carbon fiber reinforced plastics or the like. The inner peripheral surface of the sleeve member is tapered such that its inner diameter increases continuously from one axial end portion toward the other axial end portion.

CITATION LIST

Patent Literature

Patent Literature 1: Japanese Patent Application Laid-open No. 2014-212680

SUMMARY

Technical Problem

To reliably transmit torque to a shaft that is rotating at high speed, it is necessary to provide interference to the sleeve member such that the torque due to the friction between the permanent magnets and the sleeve member always exceeds the output torque of the rotary electric machine. The value to which the interference is to be set necessarily increases with the increase in the rotational speed range. An increase in the interference increases the press-fitting force acting on the sleeve member from the shaft when the rotor is manufactured, which increases the period of time required for a shaft press-fitting operation. In other words, it is necessary to reduce the shaft press-fitting force so as to increase the ease of assembling the rotor. Patent Literature 1 described above facilitates the shaft press-fitting operation by thinning the sleeve member.

However, when the thinned portion of the sleeve member is supported and the shaft member is press-fitted into the sleeve member, stress may concentrate on the thinned portion and the sleeve member itself may become buckled and distorted.

To counter this, it is possible to provide the sleeve member with a thick flange portion and to support this flange portion. In this case, however, the thickness of the sleeve member changes greatly at the flange portion; therefore, the surface pressure increases at the flange portion when the shaft is press-fitted. This results in an increase in the shaft press-fitting force.

An increase in the shaft press-fitting force increases the possibility of causing galling between the sleeve member and the shaft. To prevent galling, it is necessary to increase the hardness of the contact surfaces of the sleeve member and the shaft by quenching or to increase the lubricity of the contact surfaces of the sleeve member and the shaft by performing fine particle shot peening. This results in increasing the cost.

The present invention has been achieved in view of the above and an object of the present invention is to provide a rotor of a rotary electric machine with which the sleeve member is prevented from becoming buckled when the shaft is press-fitted, the shaft press-fitting force is reduced, and the ease of manufacturing the rotor can be improved.

Solution to Problem

In order to solve the above problems and achieve the object, a rotor of a rotary electric machine according to an aspect of the present invention includes: a tubular sleeve member that includes a first end portion and a second end portion, which are spaced apart from each other in an axial direction, and an inner peripheral surface that forms a through hole that is parallel to the axial direction and through which a shaft passes; a plurality of permanent magnets aligned in a peripheral direction on an outer peripheral surface of the sleeve member; and a tubular reinforcing member that covers an outer peripheral surface of the permanent magnets. The first end portion is a flange portion, and the inner peripheral surface includes a first tapered surface, an inner diameter of which is continuously reduced toward the second end portion from the first end portion, and a second tapered surface, an inner diameter of which is continuously reduced toward the first end portion from the second end portion.

Advantageous Effects of Invention

According to the present invention, an effect is obtained where the sleeve member is prevented from becoming buckled when the shaft is press-fitted, the shaft press-fitting force is reduced, and the ease of manufacturing the rotor can be improved.

DESCRIPTION OF EMBODIMENTS

A rotor of a rotary electric machine, a rotary electric machine, and a rotor member of a rotary electric machine according to exemplary embodiments of the present invention will be explained below in detail with reference to the drawings. This invention is not limited to the embodiments.

First Embodiment.

Figure 1:
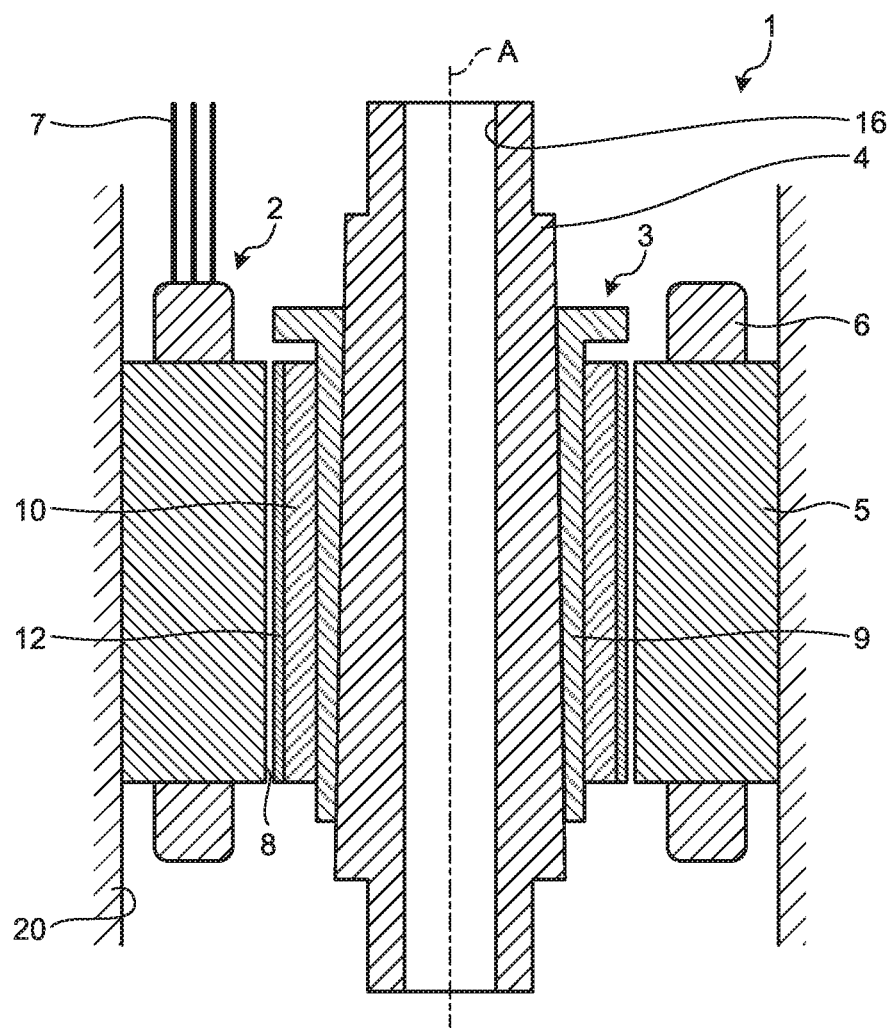
FIG. 1 is a longitudinal cross-sectional view illustrating the configuration of a rotary electric machine according to a first embodiment.
Figure 2:
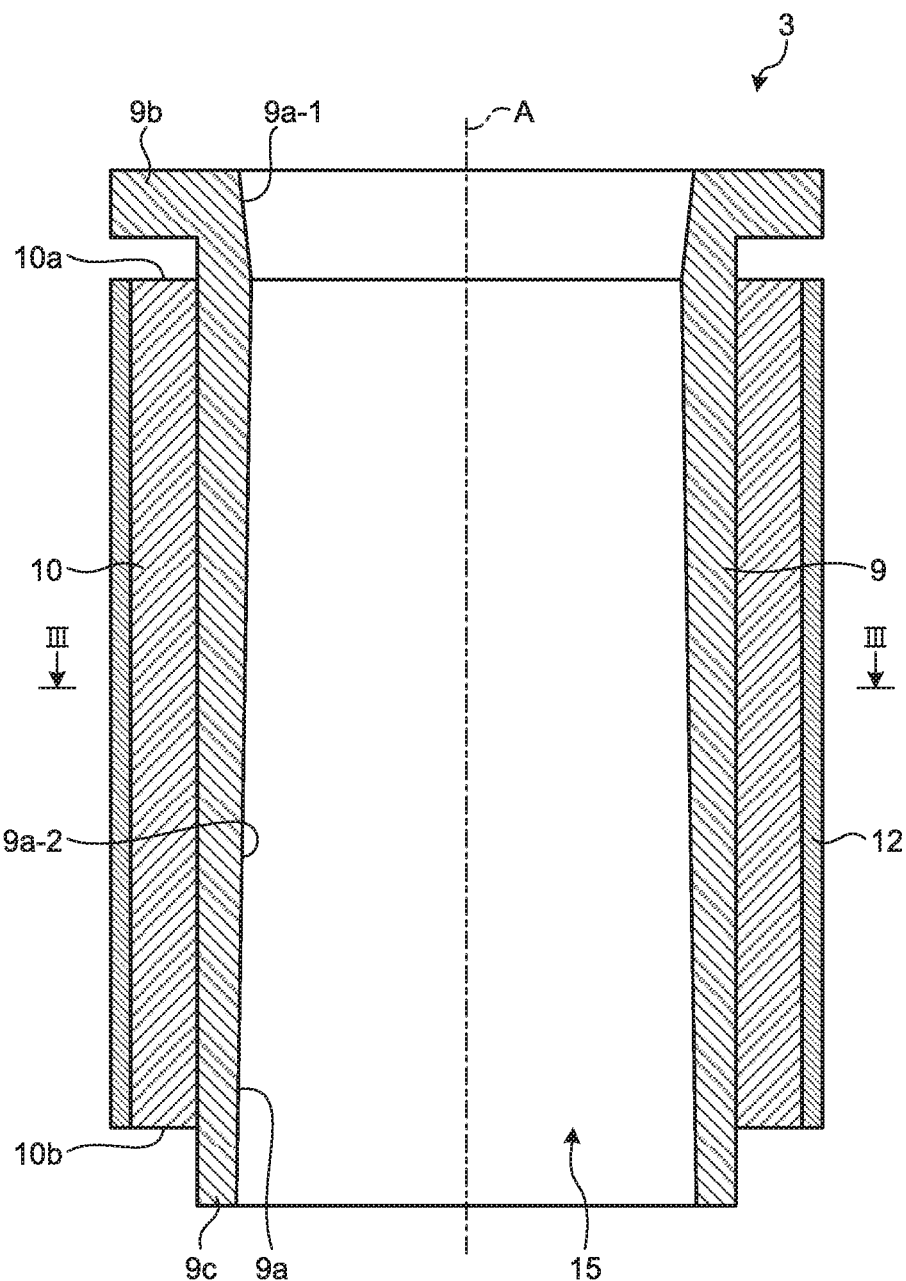
FIG. 2 is a longitudinal cross-sectional view illustrating the configuration of a rotor of the rotary electric machine according to the first embodiment.
Figure 3:
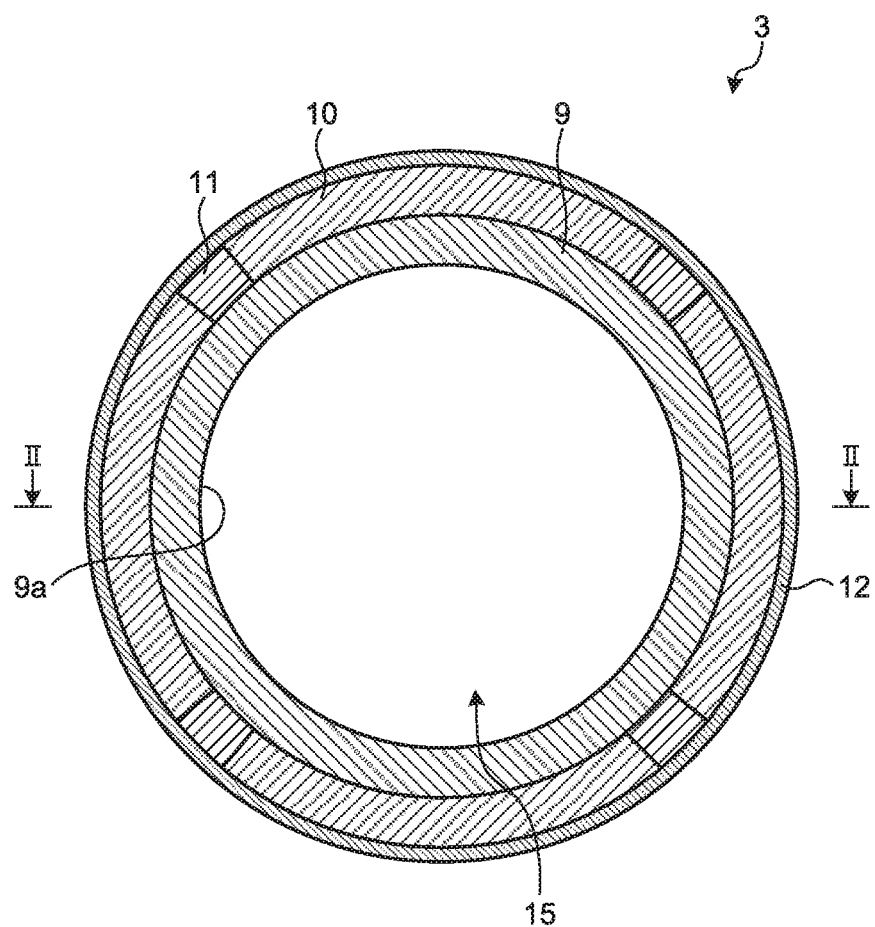
FIG. 3 is a transverse cross-sectional view illustrating the configuration of the rotor of the rotary electric machine according to the first embodiment.
Figure 4:
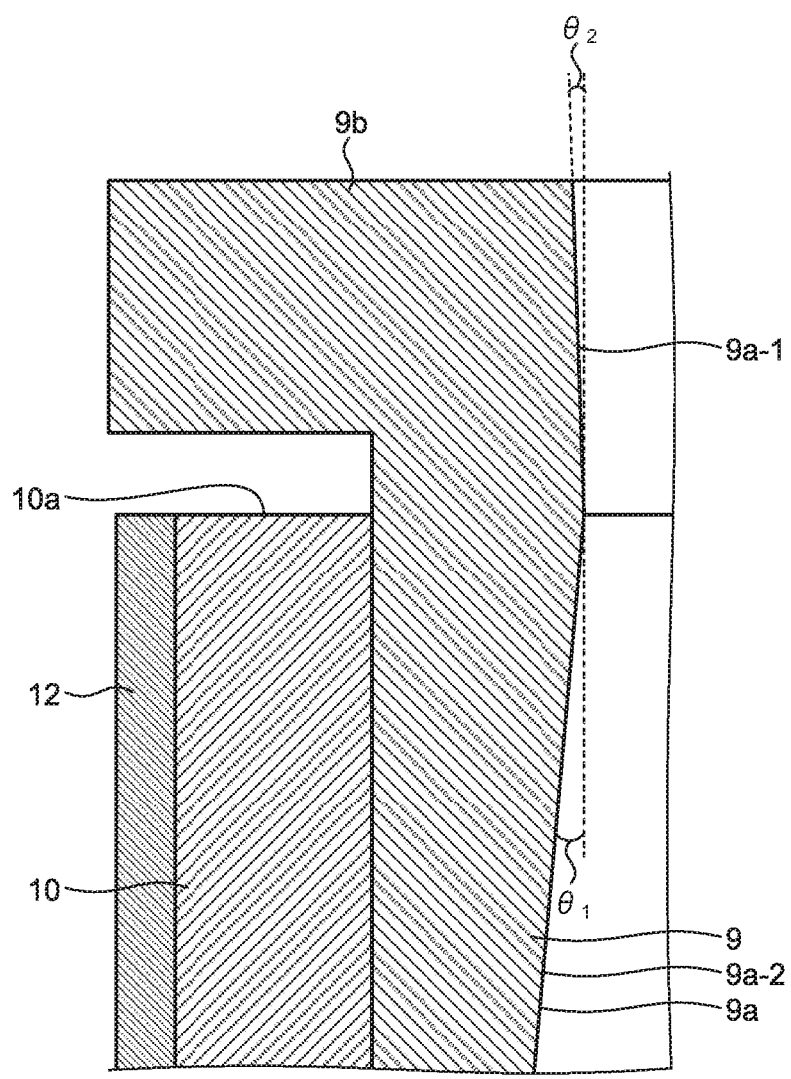
FIG. 4 is a partial enlarged view of FIG. 2.

FIG. 1 is a longitudinal cross-sectional view illustrating the configuration of a rotary electric machine according to the present embodiment; FIG. 2 is a longitudinal cross-sectional view illustrating the configuration of a rotor of the rotary electric machine according to the present embodiment; FIG. 3 is a transverse cross-sectional view illustrating the configuration of the rotor of the rotary electric machine according to the present embodiment; and FIG. 4 is a partial enlarged view of FIG. 2. FIG. 1 and FIG. 2 are cross-sectional views of a section that includes a rotational axis A. FIG. 2 is a cross-sectional view taken along line II-II in FIG. 3 and FIG. 3 is a cross-sectional view taken along line III-III in FIG. 2.

A rotary electric machine 1 according to the present embodiment includes an annular stator 2; a rotor 3 disposed on the inner side of the stator 2; and a shaft 4, which is the rotor shaft fixed to the rotor 3. The rotor 3 is the rotor of the rotary electric machine according to the present embodiment. As will be explained later, the rotor 3 is a surface permanent magnet type (SPM) rotor. In the example illustrated in FIG. 1, the rotary electric machine 1 is an electric motor.

The stator 2 includes an annular stator core 5 and coils 6 wound around the stator core 5. The stator core 5 is formed by stacking a plurality of magnetic steel sheets. Power leads 7 are connected to the coils 6 and are also connected to a power supply (not illustrated).

The rotor 3 is rotatably disposed on the inner side of the stator 2 with an air gap 8 therebetween. The rotor 3 includes a tubular sleeve member 9, which is a rotor member; a plurality of permanent magnets 10, which are aligned in the peripheral direction on the outer surface of the sleeve member 9 such that they are separated from each other; a plurality of spacing members 11, which are disposed in the spaces between the permanent magnets 10 that are adjacent to each other in the peripheral direction; and a reinforcing member 12, which covers the permanent magnets 10 and the spacing members 11 in the peripheral direction.

The "peripheral direction" indicates the peripheral direction of the sleeve member 9. In the following description, the "radial direction" indicates the radial direction of the sleeve member 9 and the "axial direction" indicates the axial direction of the sleeve member 9. The "axial direction" matches the direction of the rotational axis A.

The sleeve member 9 has a through hole 15 formed therein extending in the axial direction. In other words, the sleeve member 9 has an inner peripheral surface 9a that forms the through hole 15 through which the shaft 4 passes and which is parallel to the axial direction or has a taper angle with respect to the axial direction. The sleeve member 9 is made of a metal magnetic material. In the present embodiment, the sleeve member 9 is formed from a steel tube.

The shaft 4 is press-fitted into the through hole 15. The shaft 4 may be press-fitted into the through hole 15 also by using shrink-fitting or expansion-fitting. The shaft 4 passes through the through hole 15, whereby the sleeve member 9 is fixed to the shaft 4. The shape and size of the inner peripheral surface 9a are determined with the interference taken into consideration. The shaft 4 is formed from steel. The shaft 4 has a hollow 16 formed therein. The shaft 4 may be solid. FIG. 1 illustrates only part of the shaft 4.

The sleeve member 9 includes end portions 9b and 9c, which are separated from each other in the axial direction. The end portion 9b is a first end portion and the end portion 9c is a second end portion. The end portion 9b forms a flange. In other words, the end portion 9b is a flange portion. The outer peripheral surface of the sleeve member 9 excluding the end portion 9b has a cylindrical surface having a uniform outer diameter that is less than the outer diameter of the end portion 9b. The end portion 9b is thicker than the other portions of the sleeve member 9. The sleeve member 9 excluding the end portion 9b is preferably thinner in order to facilitate the press-fitting operation of the shaft 4. At any point along the axial direction, the sleeve member 9 excluding the end portion 9b, i.e., the thinned portion of the sleeve member 9, has a thickness in the range of 1 mm to 10 mm. The end portion 9b forms a flange in order to prevent the sleeve member 9 itself from becoming buckled and distorted when the shaft 4 is press-fitted. The "thickness" indicates the thickness in the radial direction.

The inner peripheral surface 9a includes a tapered surface 9a-1, which is a first tapered surface with its inner diameter continuously reduced from the end portion 9b toward the end portion 9c; and a tapered surface 9a-2, which is a second tapered surface with its inner diameter continuously reduced from the end portion 9c toward the end portion 9b. In other words, the tapered surface 9a-1 continuously narrows toward the inner side in the radial direction as it approaches the end portion 9c from the end portion 9b and the tapered surface 9a-2 continuously narrows toward the inner side in the radial direction as it approaches the end portion 9b from the end portion 9c. The tapered surface 9a-1 is connected to the tapered surface 9a-2. The tapered surface 9a-1 is formed over a certain length in the axial direction from the end surface of the sleeve member 9 on the end portion 9b side. The tapered surface 9a-2 is formed over a certain length in the axial direction from the end surface of the sleeve member 9 on the end portion 9c side.

The tapered surface 9a-1 includes the inner peripheral surface of the end portion 9b, which is a flange portion, and reaches the inner peripheral surface of the thinned portion of the sleeve member 9. The tapered surface 9a-1 does not extend beyond the position of end surfaces 10a of the permanent magnets 10 and does not reach the end portion 9c side in the axial direction. In other words, the tapered surface 9a-1 is formed in a range that extends from the inner peripheral surface of the end portion 9b to the inner peripheral surface of the thinned portion of the sleeve member 9 but does not extend beyond the position of the end surfaces 10a of the permanent magnets 10. The end surfaces 10a are end surfaces of the permanent magnets 10 on the end portion 9b side and end surfaces 10b are end surfaces of the permanent magnets 10 on the end portion 9c side.

The tapered surface 9a-1 is a linear tapered surface having a constant inclination angle with respect to the axial direction. In a similar manner, the tapered surface 9a-2 is a linear tapered surface having a constant inclination angle with respect to the axial direction. In FIG. 4, the magnitude of the inclination angle of the tapered surface 9a-2 is represented by $\theta_1$ and the magnitude of the inclination angle of the tapered surface 9a-1 is represented by $\theta_2$. Although it depends on the maximum rotational speed and the interference, the magnitudes of the inclination angles $\theta_1$ and $\theta_2$ are preferably set within the range of 0° to 10° when consideration is given to the ease of assembly.

The permanent magnets 10 are aligned on the outer peripheral surface of the sleeve member 9 at equal intervals in the peripheral direction. The permanent magnets 10 are fixed to the outer peripheral surface of the sleeve member 9 with an adhesive. In a similar manner, the spacing members 11 are aligned on the outer peripheral surface of the sleeve member 9 at equal intervals in the peripheral direction. The spacing members 11 are fixed to the outer peripheral surface of the sleeve member 9 with an adhesive. The spacing members 11 fill the spaces between the permanent magnets 10. In the example illustrated in FIG. 4, the number of the permanent magnets 10 and the number of the spacing members 11 are each four.

The permanent magnets 10 each have an arched transverse cross-sectional shape with a constant thickness in the radial direction. The permanent magnets 10 each have a rectangular longitudinal cross-sectional shape. The length of the permanent magnets 10 in the axial direction is smaller than the length of the sleeve member 9 in the axial direction. The permanent magnets 10 are disposed on the outer peripheral surface of the sleeve member 9 excluding the end portions 9b and 9c.

The spacing members 11 each have an arched transverse cross-sectional shape with a constant thickness in the radial direction. The length of the spacing members 11 in the peripheral direction is smaller than the length of the permanent magnets 10 in the peripheral direction. The spacing members 11 each have a rectangular longitudinal cross-sectional shape. The length of the spacing members 11 in the axial direction is equal to the length of the permanent magnets 10 in the axial direction.

The permanent magnets 10 are rare-earth magnets or ferrite magnets. The spacing members 11 are made of a non-magnetic material. Specifically, the spacing members 11 are made of stainless steel, aluminum alloy, copper alloy, iron alloy, or resin.

The reinforcing member 12 covers the outer peripheral surfaces of the permanent magnets 10 and the spacing members 11. The reinforcing member 12 is tubular and is disposed coaxially with the sleeve member 9. The length of the reinforcing member 12 in the axial direction is equal to the length of the permanent magnets 10 in the axial direction. The reinforcing member 12 prevents the permanent magnets 10 and the spacing members 11 from being separated from the sleeve member 9 due to the centrifugal force generated during rotation.

The reinforcing member 12 is made of a non-magnetic material. Moreover, the reinforcing member 12 is made of a material having a high tensile strength per unit weight because its purpose is to provide reinforcement. Specifically, the reinforcing member 12 is made of carbon fiber reinforced plastics (CFRP), glass fiber reinforced plastics (GFRP), synthetic fibers, titanium, or stainless steel. When the reinforcing member 12 is made of CFRP or GFRP, the reinforcing member 12 is formed by winding a fiber bundle or fibrous tape directly around the outer peripheral surfaces of the permanent magnets 10 and the spacing members 11.

The rotary electric machine 1 is disposed in a housing 20 and the stator 2 is fixed to the housing 20. The stator 2 is fixed to the inner peripheral surface of the housing 20 by shrink-fitting, expansion-fitting, or press-fitting.

Figure 5:
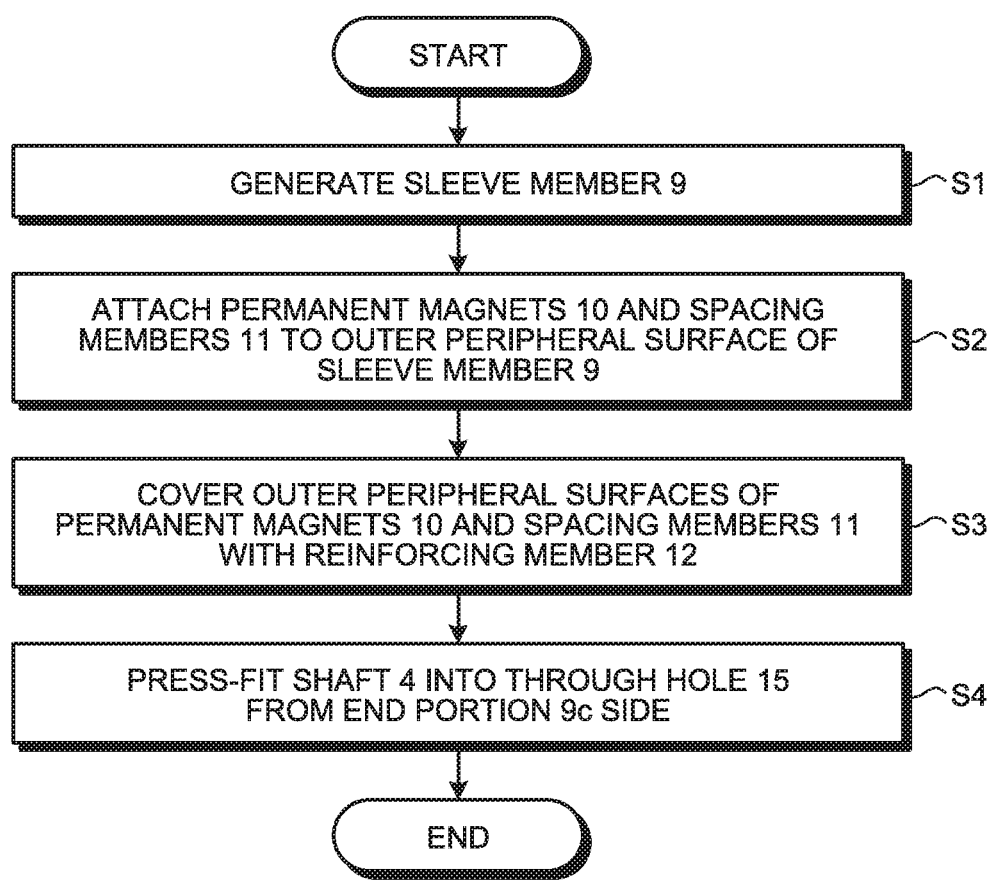
FIG. 5 is a flowchart illustrating the manufacturing method of the rotary electric machine according to the first embodiment.

An explanation will be given next of a manufacturing method of the rotary electric machine according to the present embodiment. FIG. 5 is a flowchart illustrating the manufacturing method of the rotary electric machine according to the present embodiment.

First, at S1, the sleeve member 9 is generated. The sleeve member 9 is formed by machining the outer peripheral surface and the inner peripheral surface of a steel tube. Next, at S2, the permanent magnets 10 and the spacing members 11 are attached to the outer peripheral surface of the sleeve member 9. The spacing members 11 are disposed such that the spaces between the permanent magnets 10 adjacent to each other in the peripheral direction are filled. Furthermore, at S3, the outer peripheral surfaces of the permanent magnets 10 and the spacing members 11 are covered with the reinforcing member 12. Then, at S4, the shaft 4 is press-fitted into the through hole 15 from the end portion 9c side so as to be passed through the through hole 15, thereby fixing the shaft 4 to the sleeve member 9. The shaft 4 is press-fitted into the sleeve member 9 in a state where the flange end portion 9b is supported. Thereafter, the rotor 3 to which the shaft 4 is provided is disposed on the inner side of the stator 2.

Figure 6:
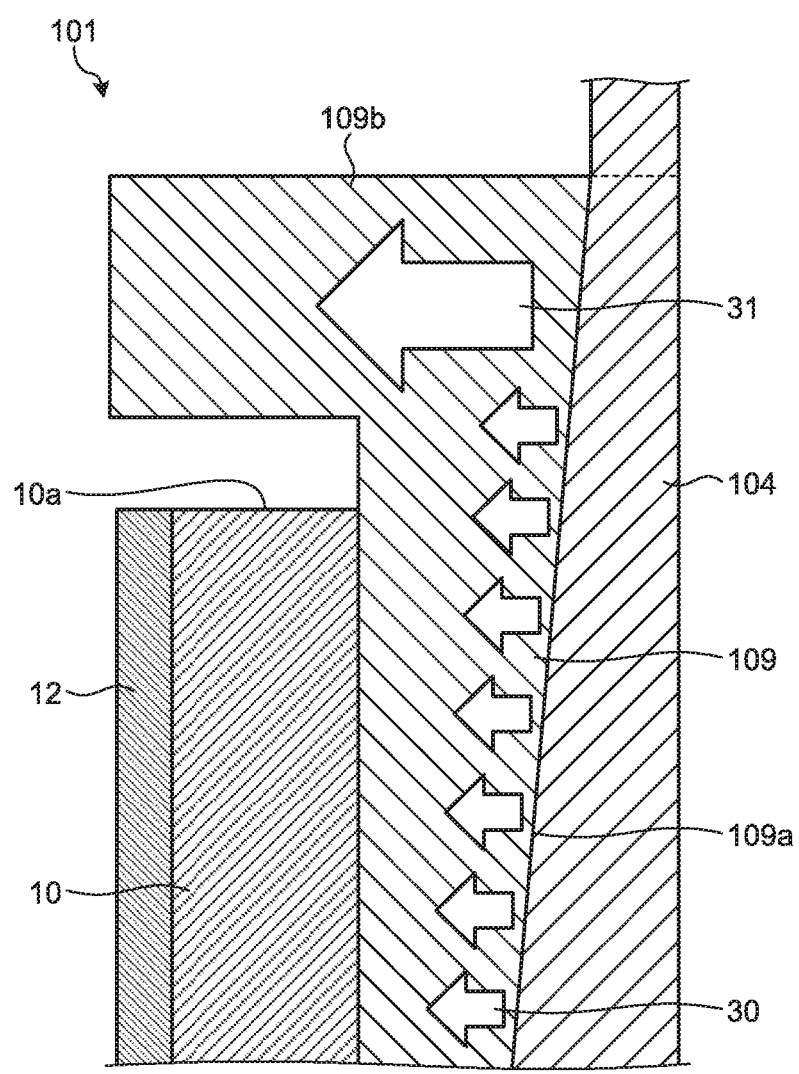
FIG. 6 is a diagram illustrating the stress generated state when a shaft is press-fitted into a rotor according to a comparison example.

Next, an explanation will be given of an effect of the present embodiment by way of contrasting it with a comparison example. FIG. 6 is a diagram illustrating stress generated when a shaft is press-fitted into a rotor according to the comparison example. FIG. 6 is a partial enlarged view of the same portion as that in FIG. 4. In FIG. 6, components identical to those illustrated in FIG. 4 are denoted by the same reference numerals.

A rotor 101, which is a rotor in the comparison example, includes a sleeve member 109. When a comparison is made between the sleeve member 109 and the sleeve member 9 illustrated in FIG. 4, the shape of an inner peripheral surface 109a of the sleeve member 109 is different from the shape of the inner peripheral surface 9a illustrated in FIG. 4. Specifically, the inner peripheral surface 109a is formed as a single linear tapered surface having a constant inclination angle with respect to the axial direction. The inner peripheral surface 109a continuously and uniformly widens toward the outer side in the radial direction as it approaches the end portion (not illustrated) of the sleeve member 109 from a flange end portion 109b of the sleeve member 109. Other configurations of the rotor 101 are similar to those of the rotor 3 illustrated in FIG. 2.

FIG. 6 illustrates stresses 30 and 31 acting on the inner peripheral surface 109a of the sleeve member 109 when a shaft 104 is press-fitted. The shaft 104 is press-fitted into the sleeve member 109 from the end portion (not illustrated) side of the sleeve member 109. The inner peripheral surface 109a is formed as a single linear tapered surface and the inner diameter of the inner peripheral surface 109a continuously and uniformly narrows as it approaches the end portion 109b from the end portion (not illustrated) of the sleeve member 109. Consequently, the stress 31 acting on the end portion 109b having large thickness and high stiffness becomes larger than the stress 30 acting on the thinned portion of the sleeve member 109, which has less change in thickness. The stress 31 acting on the end portion 109b reduces the ease of the shaft press-fitting operation.

Figure 7:
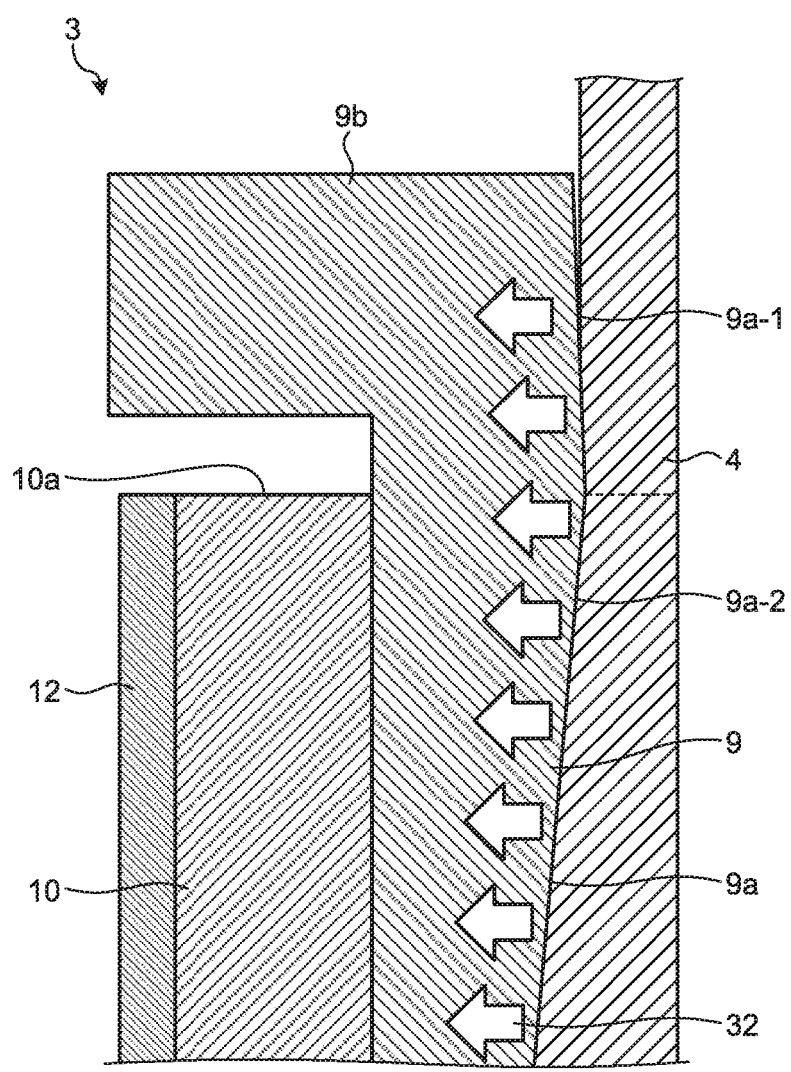
FIG. 7 is a diagram illustrating the stress generated state when a shaft is press-fitted into the rotor according to the first embodiment.

FIG. 7 is a diagram illustrating stress generated when the shaft is press-fitted into the rotor according to the present embodiment. FIG. 7 is a partial enlarged view of the same portion as that in FIG. 4. In FIG. 7, components identical to those illustrated in FIG. 4 are denoted by the same reference numerals.

FIG. 7 illustrates stress 32 acting on the inner peripheral surface 9a of the sleeve member 9 when the shaft 4 is press-fitted. The shaft 4 is press-fitted into the sleeve member 9 from the end portion 9c side illustrated in FIG. 2. In the present embodiment, the inner peripheral surface 9a includes the tapered surfaces 9a-1 and 9a-2, which are inclined in different directions. In particular, the tapered surface 9a-1 widens toward the outer side in the radial direction as it approaches the end portion 9b from the boundary with the tapered surface 9a-2 so that the interference between the sleeve member 9 and the shaft 4 is reduced.

Consequently, the stress 32 acting on the end portion 9b becomes lower than the stress 31 in the comparison example and can be made equal to the stress 32 acting on the thinned portion of the sleeve member 9. In other words, in the present embodiment, the stress 32 acting on the end portion 9b having large thickness and high stiffness can be reduced, which facilitates the shaft press-fitting operation.

As described above, the end portion 9b does not have to hold the permanent magnets 10; therefore, the interference is reduced by the tapered surface 9a-1 and thus the surface pressure acting on the end portion 9b is reduced. Meanwhile, the thinned portion of the sleeve member 9 excluding the end portion 9c has to hold the permanent magnets 10; therefore, the interference is secured by the tapered surface 9a-2.

According to the present embodiment, by using the end portion 9b, which is a flange portion, as a support and by press-fitting the shaft 4 into the sleeve member 9, the sleeve member 9 can be prevented from becoming buckled. Therefore, the quality of the rotor 3 is improved.

Moreover, according to the present embodiment, because the inner peripheral surface 9a includes the tapered surface 9a-1, the press-fitting force of the shaft 4 is reduced and thus the ease of manufacturing the rotor 3 can be improved.

In the present embodiment, the tapered surface 9a-2 is formed as a linear tapered surface; however, the tapered surface 9a-2 is not limited thereto. The same is true for the tapered surface 9a-1. The tapered surfaces 9a-1 and 9a-2 may each be formed as a non-linear tapered surface in which the inclination angle with respect to the axial direction changes.

Moreover, the tapered surface 9a-2 is formed as a single linear tapered surface; however, the tapered surface 9a-2 is not limited thereto. The tapered surface 9a-2 may be formed by connecting a plurality of linear tapered surfaces having different inclination angles with respect to the axial direction. In this case, the magnitudes of the inclination angles of the linear tapered surfaces can be set such that successive inclination angles become smaller from the end portion 9c toward the end portion 9b. The same is true for the tapered surface 9a-1. The tapered surface 9a-1 may be formed by connecting a plurality of linear tapered surfaces having different inclination angles with respect to the axial direction. In this case, the magnitudes of the inclination angles of the linear tapered surfaces can be set such that successive inclination angles become smaller from the end portion 9b toward the end portion 9c.

Furthermore, in the present embodiment, the thickness of the sleeve member 9 excluding the end portion 9b, i.e., the thickness of the thinned portion of the sleeve member 9, is in a range of 1 mm to 10 mm; however, the thickness may be outside this range depending on the material of the sleeve member 9.

In the present embodiment, the number of the permanent magnets 10 is four; however, it is not limited thereto. The number of the permanent magnets 10 is determined depending on the number of poles of the rotor 3. Moreover, the permanent magnets 10 may be divided in the axial direction. The same is true for the spacing members 11.

In the present embodiment, the spacing members 11 are made of a non-magnetic material. Having the spacing members 11 made of a non-magnetic material can reduce the flux short-circuiting loss in the sleeve member 9 and the spacing members 11. The spacing members 11 may be made of a material other than a non-magnetic material.

Moreover, the material of the spacing members 11 can be selected such that its specific weight is equal to that of the permanent magnets 10. Consequently, the centrifugal force acting on the spacing members 11 and the permanent magnets 10 is equalized; therefore, stress can be prevented from locally concentrating on the reinforcing member 12.

The spacing members 11 are disposed in order to increase the ease of attaching the permanent magnets 10 and equalizing the stress acting on the reinforcing member 12. The spacing members 11 can also be eliminated. In particular, when the stress acting on the reinforcing member 12 is less than the fatigue strength of the reinforcing member 12, there is no problem in omitting the spacing members 11. Moreover, the spacing members 11 can be eliminated by aligning the permanent magnets 10 in the peripheral direction with no spaces therebetween.

In the present embodiment, the reinforcing member 12 is made of a non-magnetic material. This can suppress a reduction in the output of the rotary electric machine 1 due to leakage flux. Specifically, the reinforcing member 12 is made of carbon fiber reinforced plastics, glass fiber reinforced plastics, synthetic fibers, titanium, or stainless steel; however, the reinforcing member 12 may be made of a combination of two or more materials selected from the above materials.

In the present embodiment, a space is provided between the end portion 9b and the permanent magnet 10. This space suppresses the leakage flux from the end portion of the permanent magnet 10. The end surfaces 10a can be brought into contact with the end portion 9b by increasing the length of the permanent magnets 10 in the axial direction. In this case, however, the flux from the permanent magnets 10 may leak via the end portion 9b.

Second Embodiment.

Figure 8:
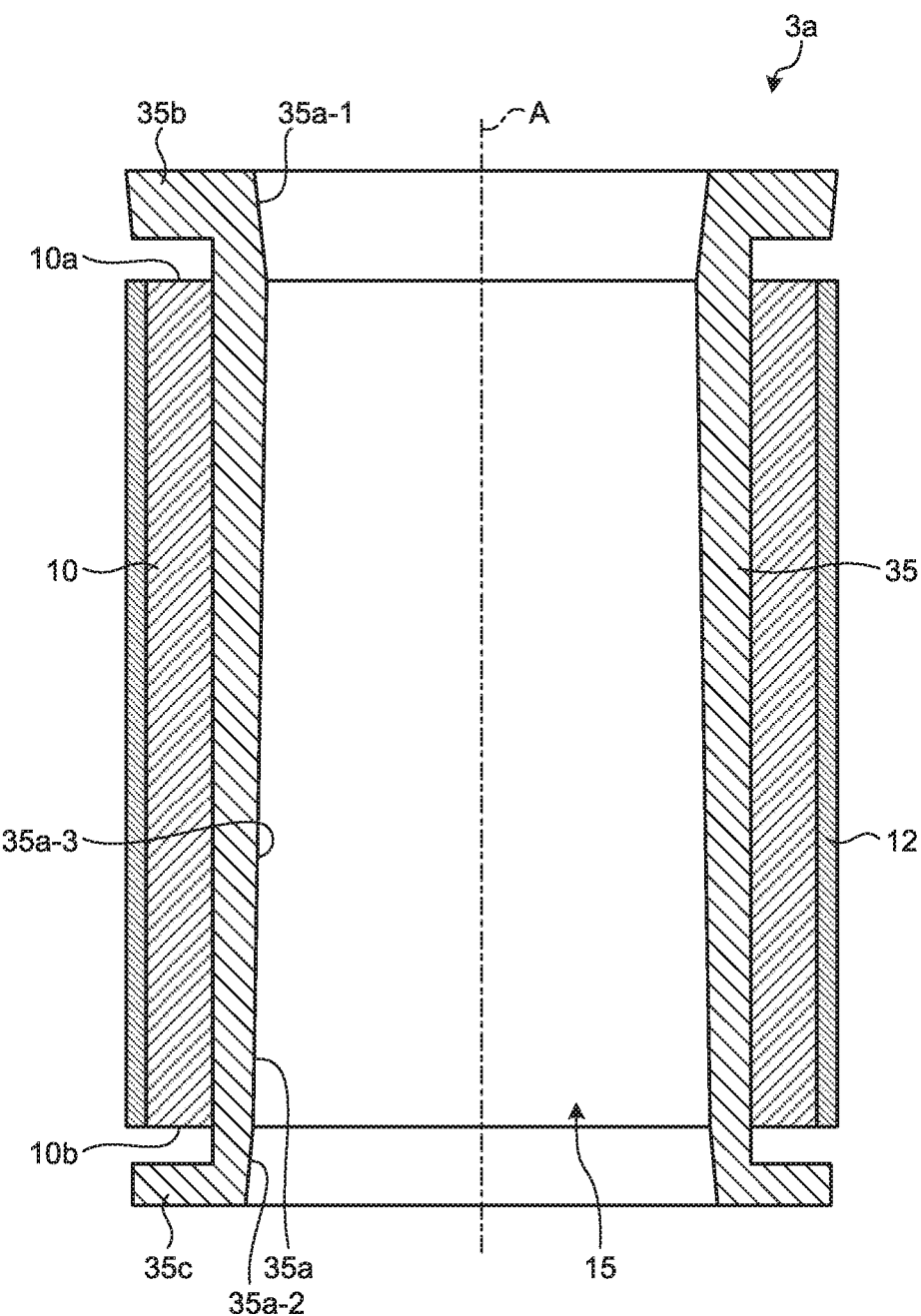
FIG. 8 is a longitudinal cross-sectional view illustrating the configuration of a rotor of a rotary electric machine according to a second embodiment.

FIG. 8 is a longitudinal cross-sectional view illustrating the configuration of a rotor of a rotary electric machine according to the present embodiment. In FIG. 8, components identical to those of the rotor 3 illustrated in FIG. 2 are denoted by the same reference numerals.

A rotor 3a according to the present embodiment includes a tubular sleeve member 35, which is a rotor member. The sleeve member 35 has an inner peripheral surface 35a that forms the through hole 15. Moreover, the sleeve member 35 includes end portions 35b and 35c, which are separated from each other in the axial direction. The end portion 35b is a first end portion and the end portion 35c is a second end portion. The end portions 35b and 35c both form flanges. In other words, the end portion 35b is a first flange portion and the end portion 35c is a second flange portion. The outer peripheral surface of the sleeve member 35 excluding the end portions 35b and 35c has a cylindrical surface having a uniform outer diameter that is less than the outer diameter of the end portions 35b and 35c. The end portions 35b and 35c are thicker than the other portions of the sleeve member 35. At any point along the axial direction, the sleeve member 35 excluding the end portions 35b and 35c, i.e., the thinned portion of the sleeve member 35, has a thickness in the range of 1 mm to 10 mm.

The inner peripheral surface 35a includes a tapered surface 35a-1, which is a first tapered surface with its inner diameter continuously reduced from the end portion 35b toward the end portion 35c; and tapered surfaces 35a-2 and 35a-3, which are a second tapered surface with its inner diameter continuously reduced from the end portion 35c toward the end portion 35b. In other words, the second tapered surface is formed by connecting the tapered surfaces 35a-2 and 35a-3. The tapered surface 35a-1 is connected to the tapered surface 35a-3. The tapered surface 35a-1 is formed over a certain length in the axial direction from the end surface of the sleeve member 35 on the end portion 35b side. The tapered surface 35a-2 is formed over a certain length in the axial direction from the end surface of the sleeve member 35 on the end portion 35c side.

The tapered surface 35a-1 is a linear tapered surface having a constant inclination angle with respect to the axial direction. The tapered surface 35a-1 includes the inner peripheral surface of the end portion 35b, which is a first flange portion, and reaches the inner peripheral surface of the thinned portion of the sleeve member 35. The tapered surface 35a-1 does not extend beyond the position of the end surfaces 10a of the permanent magnets 10 and does not reach the end portion 35c side in the axial direction. In other words, the tapered surface 35a-1 is formed in a range that extends from the inner peripheral surface of the end portion 35b to the inner peripheral surface of the thinned portion of the sleeve member 35 but does not extend beyond the position of the end surfaces 10a of the permanent magnets 10.

The tapered surface 35a-2 is a linear tapered surface having a constant inclination angle with respect to the axial direction. The tapered surface 35a-2 includes the inner peripheral surface of the end portion 35c, which is a second flange portion, and reaches the inner peripheral surface of the thinned portion of the sleeve member 35. The tapered surface 35a-2 does not extend beyond the position of the end surfaces 10b of the permanent magnets 10 and does not reach the end portion 35b side in the axial direction. In other words, the tapered surface 35a-2 is formed in a range that extends from the inner peripheral surface of the end portion 35c to the inner peripheral surface of the thinned portion of the sleeve member 35 but does not extend beyond the positon of the end surfaces 10b of the permanent magnets 10.

The tapered surface 35a-3 is a linear tapered surface having a constant inclination angle with respect to the axial direction. The magnitude of the inclination angle of the tapered surface 35a-3 is different from that of the tapered surface 35a-2. Specifically, the magnitude of the inclination angle of the tapered surface 35a-2 is larger than that of the tapered surface 35a-3. The tapered surface 35a-3 is disposed between the tapered surfaces 35a-1 and 35a-2.

The magnitudes of the inclination angles of the tapered surfaces 35a-1, 35a-2, and 35a-3 are set in a range of 0° to 10°.

Other configurations of the rotor 3a are similar to those of the rotor 3 illustrated in FIG. 2. A shaft (not illustrated) is press-fitted into the sleeve member 35 from the end portion 35c side.

In the present embodiment, in a similar manner to the first present embodiment, the tapered surface 35a-1 widens toward the outer side in the radial direction as it approaches the end portion 35b from the boundary with the tapered surface 35a-3 so that the interference between the sleeve member 35 and the shaft (not illustrated) is reduced. Consequently, the stress acting on the end portion 35b can be reduced in a similar manner to the stress acting on the thinned portion of the sleeve member 35.

Moreover, in the present embodiment, by using both the end portions 35b and 35c, which are flange portions, as a support and by press-fitting the shaft (not illustrated) into the sleeve member 35, the sleeve member 35 can be prevented from becoming buckled.

Furthermore, in the present embodiment, the magnitude of the inclination angle of the tapered surface 35a-2 is made larger than that of the tapered surface 35a-3. Consequently, in the end portion 35c, the interference between the sleeve member 35 and the shaft (not illustrated) is reduced and thus the stress acting on the end portion 35c is reduced in a similar manner to the stress acting on the thinned portion of the sleeve member 35.

In the present embodiment, the first tapered surface with its inner diameter continuously reduced from the end portion 35b toward the end portion 35c is the tapered surface 35a-1, which is a single linear tapered surface. The second tapered surface with its inner diameter continuously reduced from the end portion 35c toward the end portion 35b is the tapered surfaces 35a-2 and 35a-3, which are two linear tapered surfaces connected to each other. However, such configurations are not a limitation and the second tapered surface can be a single linear tapered surface in a similar manner to the first present embodiment.

Moreover, the second tapered surface may be formed by connecting three or more linear tapered surfaces having different inclination angles with respect to the axial direction. In this case, the magnitudes of the inclination angles of the three or more linear tapered surfaces can be set such that successive inclination angles become smaller from the end portion 35c toward the end portion 35b. Furthermore, the linear tapered surface that is among the three or more linear tapered surfaces and is closest to the end portion 35c can be formed only within a range that does not extend beyond the end surfaces 10b of the permanent magnets 10 and does not reach the end portion 35b side in the axial direction.

Furthermore, the first tapered surface may be formed by connecting a plurality of linear tapered surfaces having different inclination angles with respect to the axial direction. In this case, the magnitudes of the inclination angles of the tapered surfaces can be set such that successive inclination angles become smaller from the end portion 35b toward the end portion 35c.

Other configurations, operations, and effects of the present embodiment are similar to those of the first embodiment.

Third Embodiment.

Figure 9:
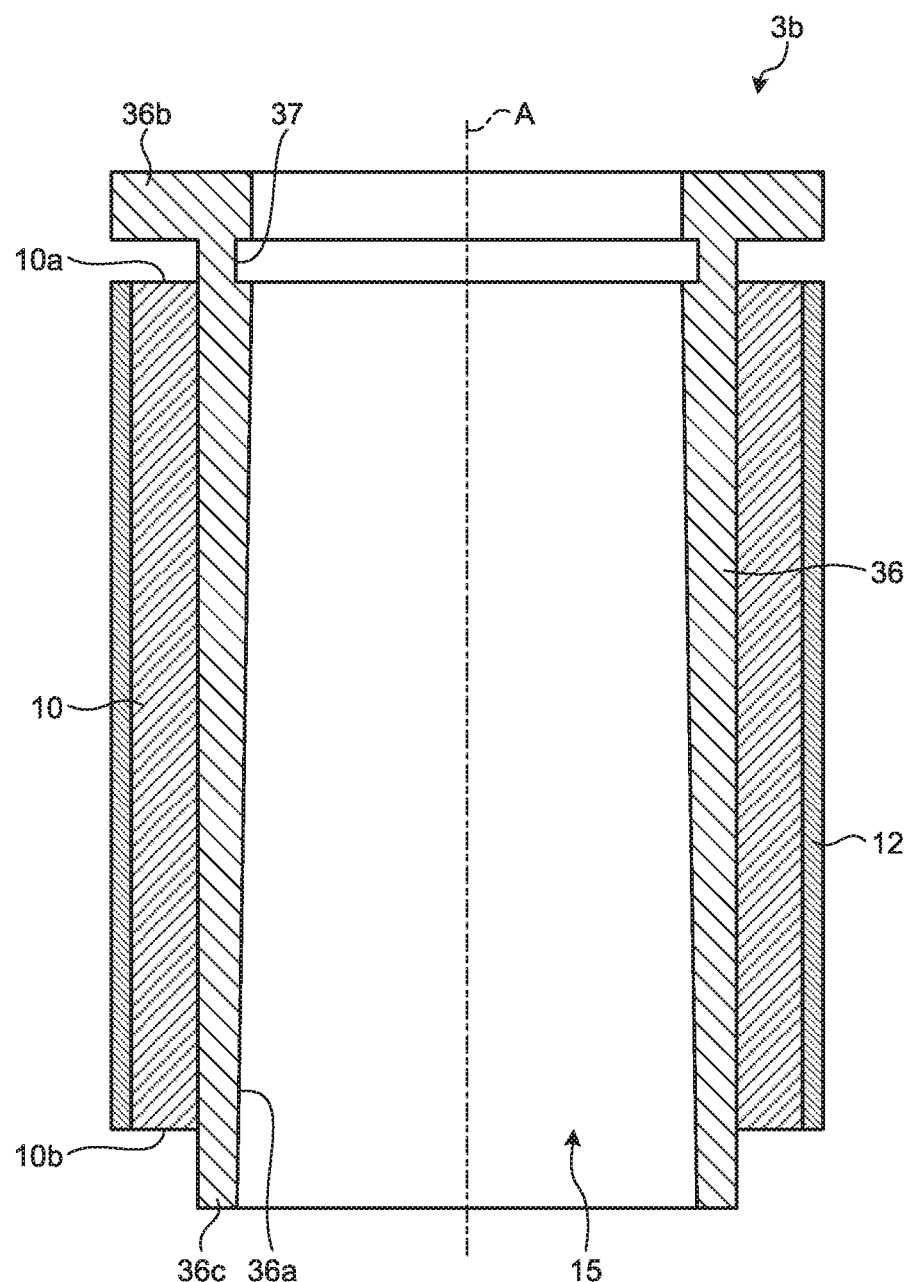
FIG. 9 is a longitudinal cross-sectional view illustrating the configuration of a rotor of a rotary electric machine according to a third embodiment.

FIG. 9 is a longitudinal cross-sectional view illustrating the configuration of a rotor of a rotary electric machine according to the present embodiment. In FIG. 9, components identical to those of the rotor 3 illustrated in FIG. 2 are denoted by the same reference numerals.

A rotor 3b according to the present embodiment includes a tubular sleeve member 36, which is a rotor member. The sleeve member 36 has an inner peripheral surface 36a that forms the through hole 15. Moreover, the sleeve member 36 includes end portions 36b and 36c, which are separated from each other in the axial direction. The end portion 36b is a first end portion and the end portion 36c is a second end portion. The end portion 36b forms a flange. In other words, the end portion 36b is a flange portion. The outer peripheral surface of the sleeve member 36 excluding the end portion 36b has a cylindrical surface having a uniform outer diameter that is less than the outer diameter of the end portion 36b. The end portion 36b is thicker than the other portions of the sleeve member 36. At any point along the axial direction, the sleeve member 36 excluding the end portion 36b, i.e., the thinned portion of the sleeve member 36, has a thickness in the range of 1 mm to 10 mm.

The inner diameter of the inner peripheral surface 36a is intermittently reduced from the end portion 36c toward the end portion 36b. Specifically, the inner diameter of the inner peripheral surface 36a excluding a groove 37 is continuously reduced from the end portion 36c toward the end portion 36b. The groove 37 is formed on the inner peripheral surface 36a; therefore, the inner peripheral surface 36a intermittently narrows toward the inner side in the radial direction as it approaches the end portion 36b from the end portion 36c.

Specifically, the annular groove 37 is formed on the inner peripheral surface 36a in the peripheral direction such that it is adjacent to the end portion 36b. The groove 37 in the peripheral direction has a uniform depth. The groove 37 has a rectangular transverse cross-sectional shape. The groove 37 does not extend beyond the position of the end surfaces 10a of the permanent magnets 10 and does not reach the end portion 36c side in the axial direction. In other words, the groove 37 is formed in a range such that it is disposed adjacent to the end portion 36b in the axial direction but does not extend beyond the position of the end surfaces 10a of the permanent magnets 10.

The inner peripheral surface 36a excluding the groove 37 is a linear tapered surface having a constant inclination angle with respect to the axial direction. The magnitude of the inclination angle is set in a range of 0° to 10°. In other words, the inner peripheral surface 36a can be regarded as a linear tapered surface that has an inclination angle of a constant magnitude with respect to the axial direction but is discontinuous at the groove 37.

Figure 10:
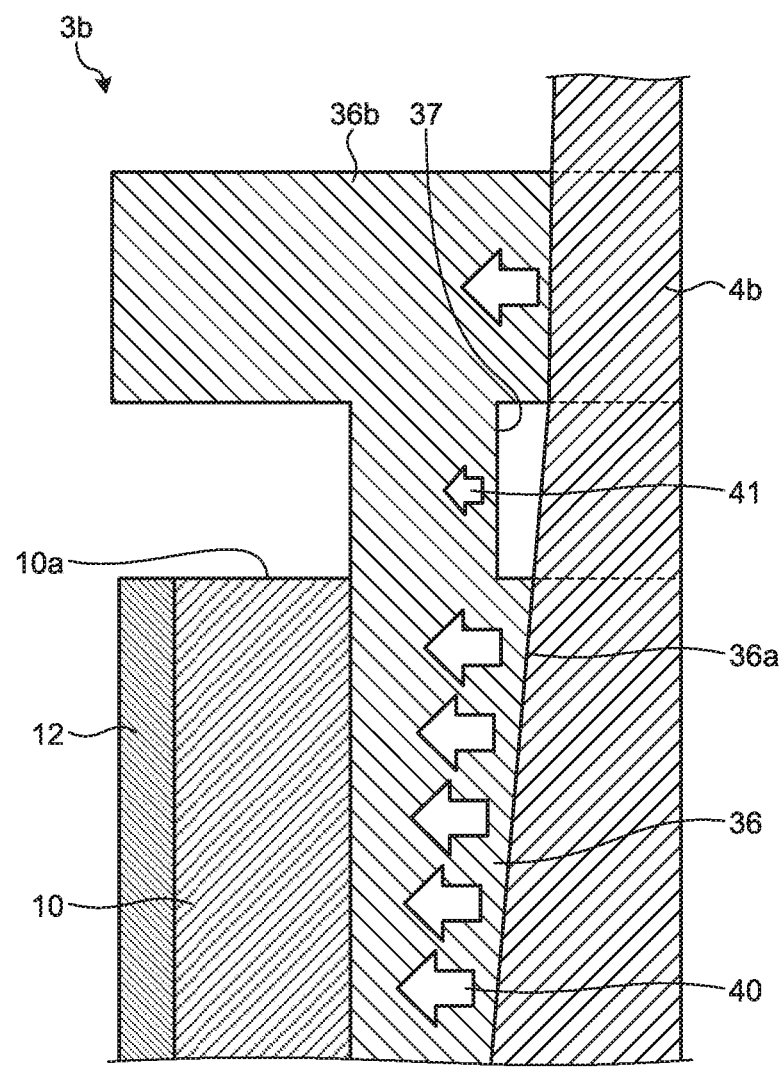
FIG. 10 is a diagram illustrating the stress generated state when a shaft is press-fitted into the rotor according to the third embodiment.

FIG. 10 is a diagram illustrating stress generated when a shaft is press-fitted into the rotor according to the present embodiment. FIG. 10 is a partial enlarged view of the same portion as that in FIG. 7. In FIG. 10, components identical to those illustrated in FIG. 7 are denoted by the same reference numerals.

FIG. 10 illustrates stresses 40 and 41 acting on the inner peripheral surface 36a of the sleeve member 36 when a shaft 4b is press-fitted. The shaft 4b is press-fitted into the sleeve member 36 from the end portion 36c side illustrated in FIG. 9. In the present embodiment, the groove 37 is provided adjacent to the end portion 36b, which is a flange portion; therefore, the sleeve member 36 becomes thinner at the groove 37 and thus the stress 40 acting on the end portion 36b from the shaft 4b is reduced. Thus, the stress 40 acting on the end portion 36b can be made equal to the stress 40 acting on the thinned portion of the sleeve member 36 excluding the groove 37.

As described above, in the present embodiment, the stress 40 acting on the end portion 36b is reduced by providing the groove 37 on the sleeve member 36 and between the end portion 36b and the permanent magnets 10 in the axial direction.

Moreover, the stress 41 acting on the groove 37 can be further reduced such that it is smaller than the stress 40 acting on the other portions of the sleeve member 36.

Other configurations of the rotor 3b are similar to those of the rotor 3 illustrated in FIG. 2.

Figure 11:
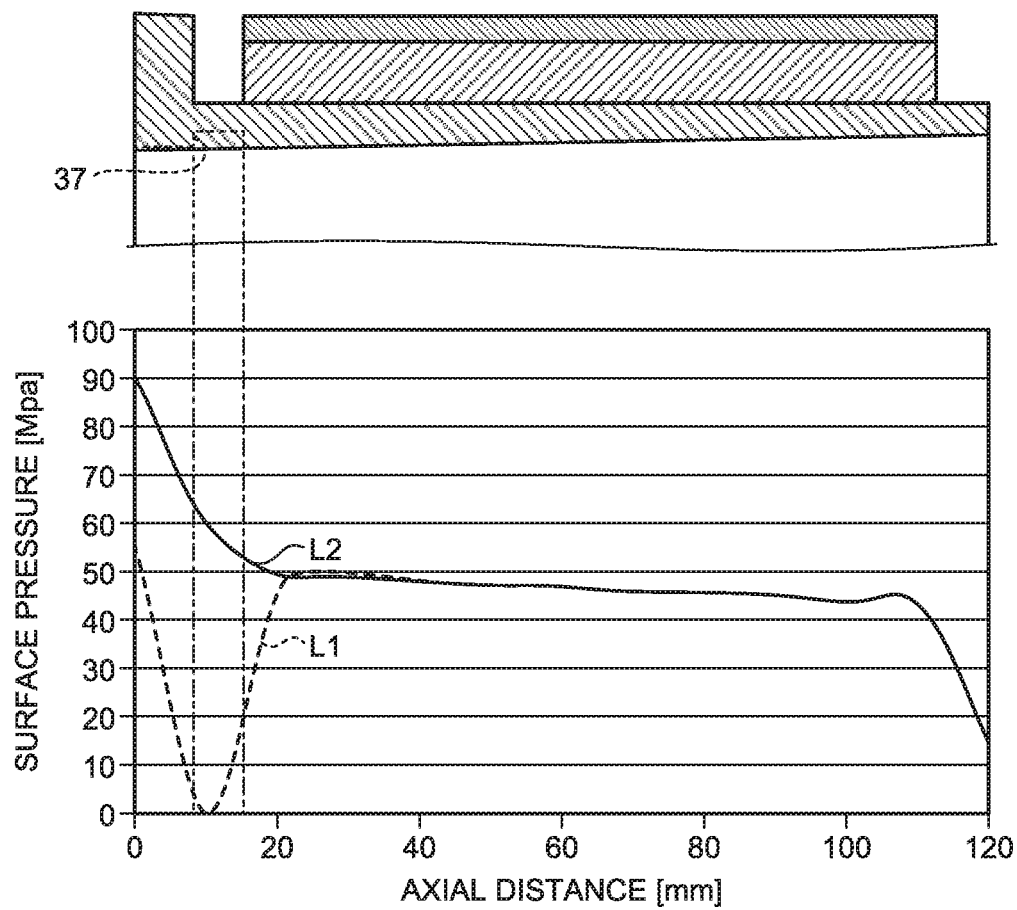
FIG. 11 is a diagram illustrating the relation between the surface pressure generated in a sleeve member and the axial distance according to the third embodiment.

FIG. 11 is a diagram illustrating the relation between the surface pressure generated in the sleeve member and the axial distance. The surface pressure corresponds to the stresses 40 and 41 described above.

In the upper portion of FIG. 11, the longitudinal cross-sectional configurations of the rotor 3b according to the present embodiment and the rotor 101 according to the comparison example illustrated in FIG. 6 are illustrated such that they are partially overlapped with each other. The rotor 3b is obtained by forming the groove 37 on the rotor 101 and thus the rotor 3b is illustrated by illustrating the groove 37 with a dotted line in the rotor 101.

The lower portion of FIG. 11 illustrates a curve L1 indicating the relation between the axial distance of the sleeve member 36 and the surface pressure generated in the inner peripheral surface 36a and illustrates a curve L2 indicating the relation between the axial distance of the sleeve member 109 and the surface pressure generated in the inner peripheral surface 109a. The axial distance is given in units of millimeters and the surface pressure is given in units of megapascals. As illustrated in FIG. 11, with the provision of the groove 37, it is possible to reduce the surface pressure generated in the end portion 36b, which is a flange portion, compared with the comparison example.

According to the present embodiment, by using the end portion 36b, which is a flange portion, as a support and by press-fitting the shaft 4b into the sleeve member 36, the sleeve member 36 can be prevented from becoming buckled. Therefore, the quality of the rotor 3b is improved.

Moreover, according to the present embodiment, because the inner peripheral surface 36a is provided with the groove 37 such that it is adjacent to the end portion 36b, the press-fitting force of the shaft 4b is reduced and thus the ease of manufacturing the rotor 3b can be improved.

In the present embodiment, the groove 37 has a rectangular transverse cross-sectional shape; however, it is not limited thereto. As another example, the groove 37 may have a semicircular transverse cross-sectional shape. Other configurations, operations, and effects of the present embodiment are similar to those of the first embodiment.

Figure 12:
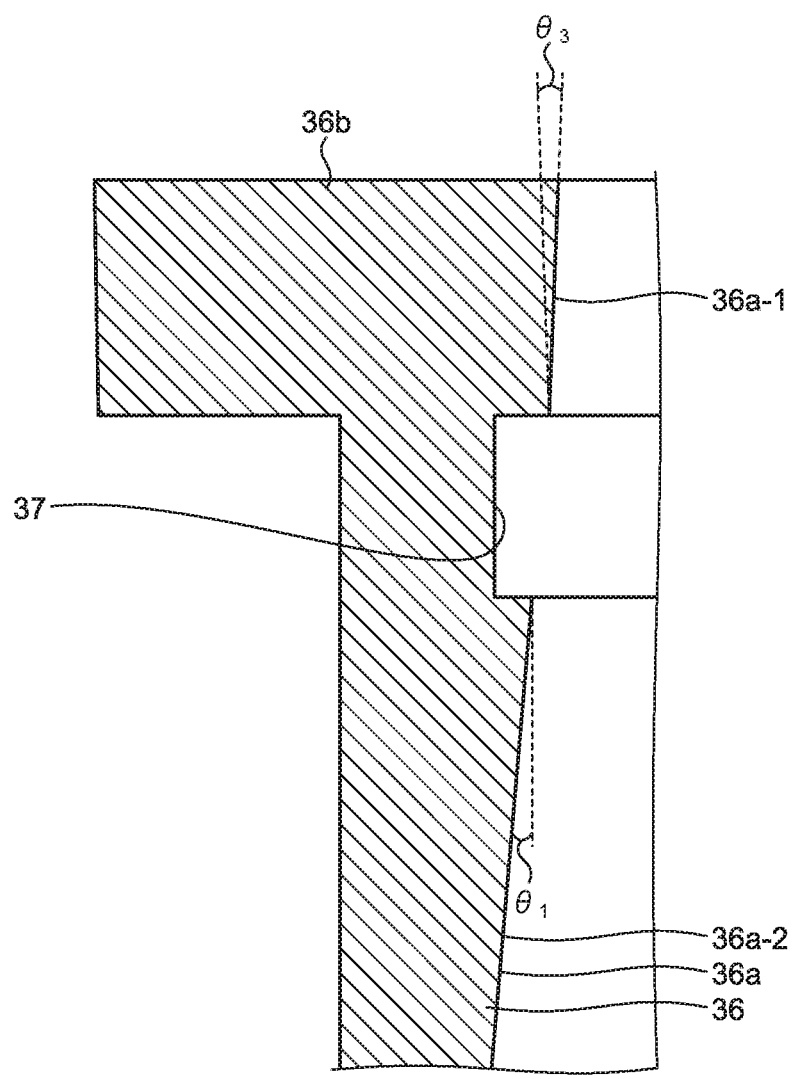
FIG. 12 is a partially enlarged longitudinal cross-sectional view of the configuration of a rotor member according to a modification of the third embodiment.

FIG. 12 is a partially enlarged longitudinal cross-sectional view of the configuration of a rotor member according to a modification of the present embodiment. In FIG. 12, components identical to those illustrated in FIG. 10 are denoted by the same reference numerals.

The sleeve member 36, which is a rotor member according to the modification, has the inner peripheral surface 36a, the inner diameter of which is intermittently reduced toward the end portion 36b from the end portion 36c in a similar manner to the present embodiment. The inner peripheral surface 36a in the modification, however, includes two tapered surfaces 36a-1 and 36a-2, which are formed with the groove 37 therebetween and have inclination angles of different magnitudes with respect to the axial direction. The tapered surfaces 36a-1 and 36a-2 are each a linear tapered surface.

In FIG. 12, the magnitude of the inclination angle of the tapered surface 36a-2 with respect to the axial direction is represented by $\theta_1$ and the magnitude of the inclination angle of the tapered surface 36a-1 with respect to the axial direction is represented by $\theta_3$. In the example illustrated in FIG. 12, the magnitude of the inclination angle $\theta_3$ is smaller than the magnitude of the inclination angle $\theta_1$.

In the modification, because the inner peripheral surface 36a is provided with the groove 37 such that it is adjacent to the end portion 36b in a similar manner to the present embodiment, the shaft press-fitting force is reduced.

Moreover, in the modification, because the magnitude of the inclination angle $\theta_3$ is smaller than the magnitude of the inclination angle $\theta_1$, the interference at the end portion 36b is reduced and thus the stress acting on the end portion 36b is further reduced. Other configurations, operations, and effects of the modification are similar to those of the present embodiment.

Although the magnitude of the inclination angle $\theta_3$ is made smaller than the magnitude of the inclination angle $\theta_1$, the magnitude of the inclination angle $\theta_3$ can be made larger than the magnitude of the inclination angle $\theta_1$.

Fourth Embodiment.

Figure 13:
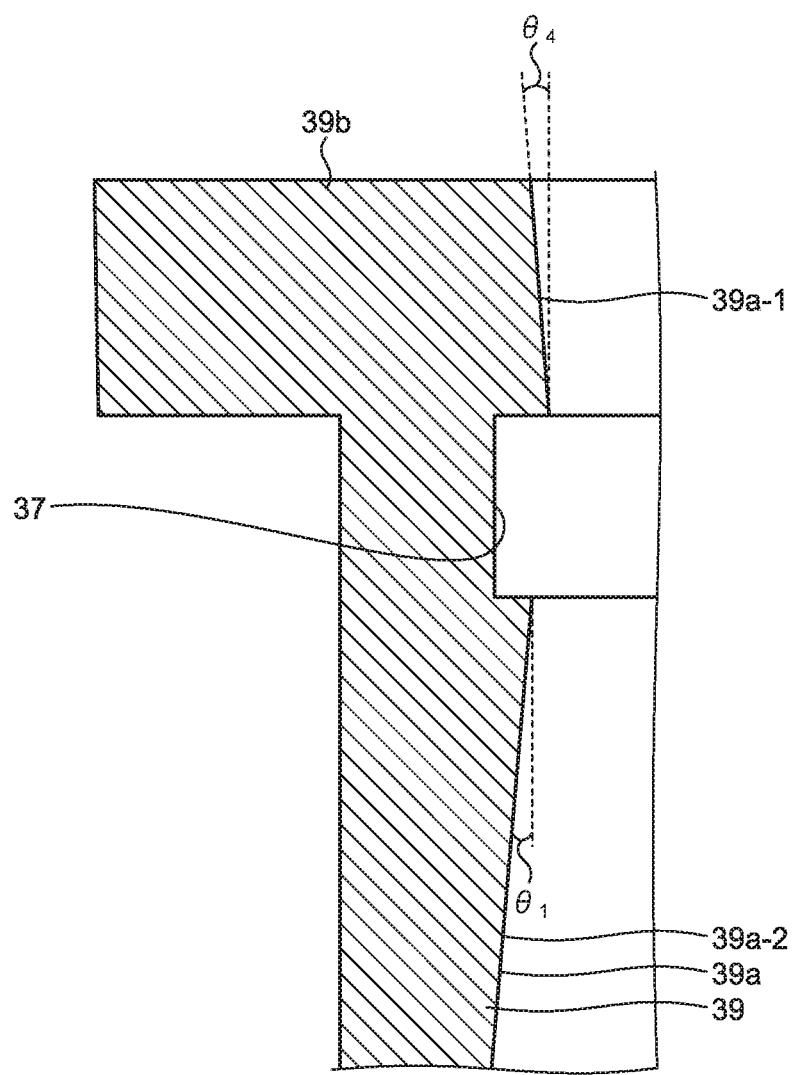
FIG. 13 is a partially enlarged longitudinal cross-sectional view of the configuration of a rotor member according to a fourth embodiment.

FIG. 13 is a partially enlarged longitudinal cross-sectional view of the configuration of a rotor member according to the present embodiment. In FIG. 13, components identical to those illustrated in FIG. 9 are denoted by the same reference numerals.

A sleeve member 39, which is a rotor member according to the present embodiment, has the same shape as that of the sleeve member 36 illustrated in FIG. 9 except for the shape of an inner peripheral surface 39a. Specifically, the sleeve member 39 includes an end portion 39b, which is a flange portion, and an end portion (not illustrated in FIG. 13). The end portion that is not illustrated in FIG. 13 is an end portion that corresponds to the end portion 36c illustrated in FIG. 9. The end portion 39b is a first end portion and the end portion that is not illustrated in FIG. 13 is a second end portion. Moreover, the inner peripheral surface 39a of the sleeve member 39 is provided with the groove 37 such that it is adjacent to the end portion 39b.

The inner peripheral surface 39a includes two tapered surfaces 39a-1 and 39a-2, which are formed with the groove 37 therebetween. In other words, the tapered surface 39a-1 is connected to the tapered surface 39a-2 via the groove 37. The tapered surface 39a-1 is a linear tapered surface with its inner diameter continuously reduced from the end portion 39b toward the end portion (not illustrated). The tapered surface 39a-2 is a linear tapered surface with its inner diameter continuously reduced from the end portion (not illustrated) toward the end portion 39b.

In FIG. 13, the magnitude of the inclination angle of the tapered surface 39a-2 with respect to the axial direction is represented by $\theta_1$ and the magnitude of the inclination angle of the tapered surface 39a-1 with respect to the axial direction is represented by $\theta_4$. In the example illustrated in FIG. 13, the magnitude of the inclination angle $\theta_4$ is smaller than the magnitude of the inclination angle of $\theta_1$. The magnitude of the inclination angle $\theta_4$ can be made larger than or equal to the magnitude of the inclination angle $\theta_1$.

Other configurations in the present embodiment are similar to those of the third embodiment. The present embodiment obtains an effect similar to that of the third embodiment.

Moreover, the sleeve member 39 according to the present embodiment can be regarded as the sleeve member 9 according to the first embodiment illustrated in FIG. 2 provided with the groove 37. Therefore, the present embodiment obtains an effect similar to that of the first embodiment.

Fifth Embodiment.

Figure 14:
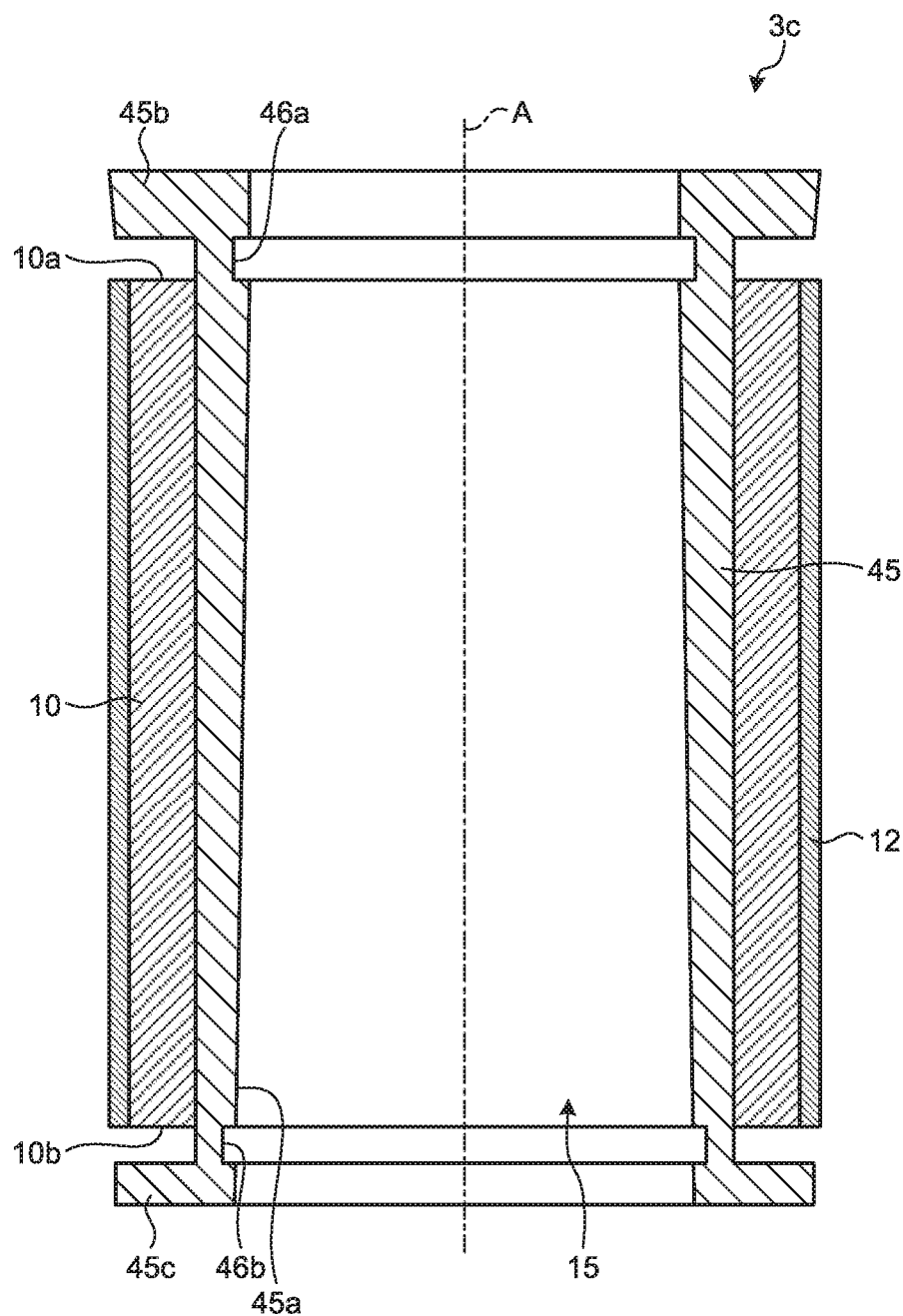
FIG. 14 is a longitudinal cross-sectional view illustrating the configuration of a rotor of a rotary electric machine according to a fifth embodiment.

FIG. 14 is a longitudinal cross-sectional view illustrating the configuration of a rotor of a rotary electric machine according to the present embodiment. In FIG. 14, components identical to those of the rotor 3b illustrated in FIG. 9 are denoted by the same reference numerals.

A rotor 3c according to the present embodiment includes a tubular sleeve member 45, which is a rotor member. The sleeve member 45 has an inner peripheral surface 45a that forms the through hole 15. Moreover, the sleeve member 45 includes end portions 45b and 45c, which are separated from each other in the axial direction. The end portion 45b is a first end portion and the end portion 45c is a second end portion. The end portions 45b and 45c both form flanges. In other words, the end portion 45b is a first flange portion and the end portion 45c is a second flange portion. The outer peripheral surface of the sleeve member 45 excluding the end portions 45b and 45c has a cylindrical surface having a uniform outer diameter that is less than the outer diameter of the end portions 45b and 45c. The end portions 45b and 45c are thicker than the other portions of the sleeve member 45. At any point along the axial direction, the sleeve member 45 excluding the end portions 45b and 45c, i.e., the thinned portion of the sleeve member 45, has a thickness in the range of 1 mm to 10 mm.

The inner diameter of the inner peripheral surface 45a is intermittently reduced from the end portion 45c toward the end portion 45b. Specifically, grooves 46a and 46b are formed on the inner peripheral surface 45a; therefore, the inner peripheral surface 45a intermittently narrows toward the inner side in the radial direction as it approaches the end portion 45b from the end portion 45c.

Specifically, the annular groove 46a is formed on the inner peripheral surface 45a in the peripheral direction such that it is adjacent to the end portion 45b and the annular groove 46b is formed on the inner peripheral surface 45a in the peripheral direction such that it is adjacent to the end portion 45c. The grooves 46a and 46b in the peripheral direction each have a uniform depth. The grooves 46a and 46b each have a rectangular transverse cross-sectional shape. The groove 46a does not extend beyond the position of the end surfaces 10a of the permanent magnets 10 and does not reach the end portion 45c side in the axial direction. In other words, the groove 46a is formed in a range such that it is disposed adjacent to the end portion 45b in the axial direction but does not extend beyond the position of the end surfaces 10a of the permanent magnets 10. The groove 46b does not extend beyond the position of the end surfaces 10b of the permanent magnets 10 and does not reach the end portion 45b side in the axial direction. In other words, the groove 46b is formed in a range such that it is disposed adjacent to the end portion 45c in the axial direction but does not extend beyond the position of the end surfaces 10b of the permanent magnets 10.

The inner peripheral surface 45a excluding the grooves 46a and 46b is a linear tapered surface having a constant inclination angle with respect to the axial direction. The magnitude of the inclination angle is set in a range of 0° to 10°. In other words, the inner peripheral surface 45a can be regarded as a linear tapered surface that has an inclination angle of a constant magnitude with respect to the axial direction but is discontinuous at the grooves 46a and 46b.

In the present embodiment, the inner peripheral surface 45a is provided with the groove 46a such that it is adjacent to the end portion 45b. Therefore, the present embodiment obtains an effect similar to that of the third embodiment.

Moreover, in the present embodiment, the inner peripheral surface 45a is provided with the groove 46b such that it is adjacent to the end portion 45c. Therefore, it is possible to reduce the stress acting on the end portion 45c when the shaft is press-fitted.

Furthermore, in the present embodiment, by using both the end portions 45b and 45c, which are flange portions, as a support and by press-fitting the shaft (not illustrated) into the sleeve member 45, the sleeve member 45 can be prevented from becoming buckled.

In the present embodiment, the grooves 46a and 46b each have a rectangular transverse cross-sectional shape; however, it is not limited thereto. As another example, the grooves 46a and 46b may each have a semicircular transverse cross-sectional shape. Other configurations, operations, and effects of the present embodiment are similar to those of the third embodiment.

Sixth Embodiment.

Figure 15:
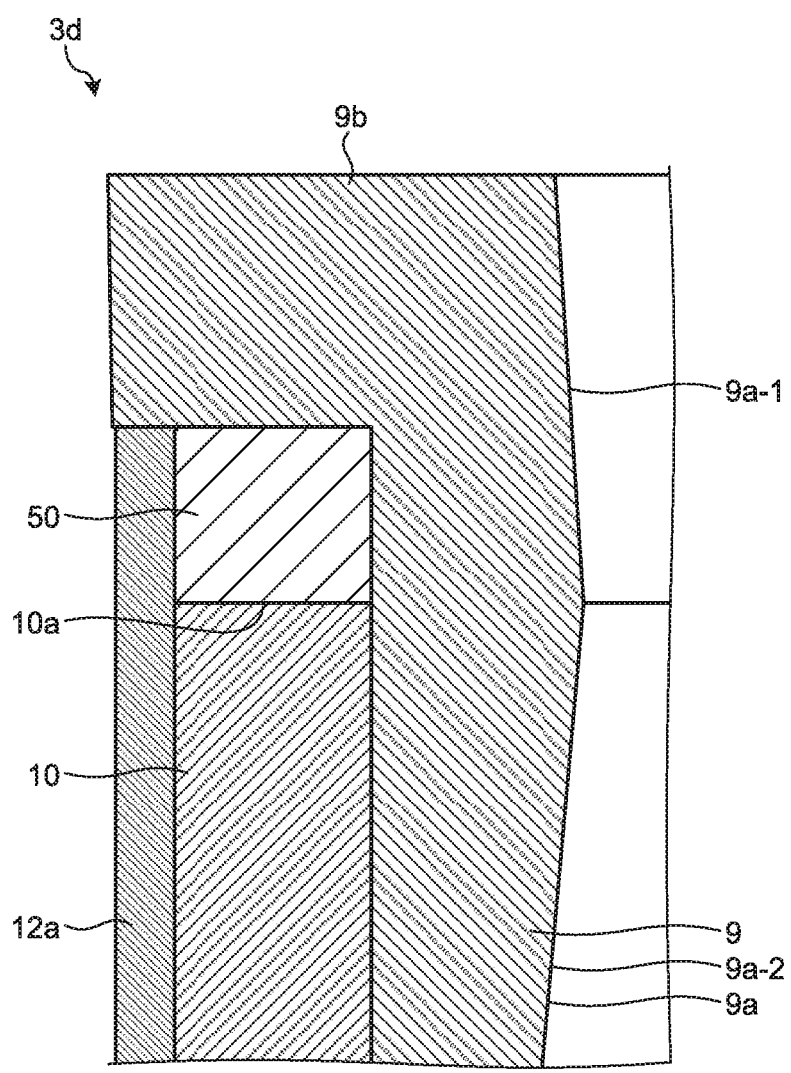
FIG. 15 is a partially enlarged longitudinal cross-sectional view of the configuration of a rotor of a rotary electric machine according to a sixth embodiment.

FIG. 15 is a partially enlarged longitudinal cross-sectional view of the configuration of a rotor of a rotary electric machine according to the present embodiment. In FIG. 15, components identical to those illustrated in FIG. 2 are denoted by the same reference numerals.

As illustrated in FIG. 15, a rotor 3d according to the present embodiment includes a spacer 50 between the flange end portion 9b and the permanent magnets 10. The spacer 50 is sandwiched between the end portion 9b and the permanent magnets 10. The spacer 50 is disposed on the outer peripheral surface of the sleeve member 9. The spacer 50 is made of a non-magnetic material. Specifically, the spacer 50 is made of stainless steel, aluminum alloy, copper alloy, iron alloy, or resin.

The spacer 50 is annular and the inner peripheral surface and the outer peripheral surface of the spacer 50 each have a cylindrical surface. The outer diameter of the spacer 50 is equal to the outer diameter of the cylindrical outer peripheral surface formed by the permanent magnets 10 and a plurality of spacing members (not illustrated in FIG. 15). As described in the first embodiment, a configuration without the spacing members is also possible. The outer peripheral surface of the end portion 9b has a cylindrical surface and the outer diameter of the end portion 9b is larger than that of the spacer 50.

Moreover, the length of a reinforcing member 12a in the axial direction is larger than the length of the permanent magnets 10 in the axial direction but is shorter than the length of the sleeve member 9 in the axial direction. The reinforcing member 12a also covers the outer peripheral surface of the spacer 50.

In the present embodiment, the spacer 50 is provided between the end portion 9b and the permanent magnets 10; therefore, when the reinforcing member 12a is directly wound around the permanent magnets 10 and the spacing members, it is possible to increase the ease of the winding operation. In other words, if there is no spacer 50, it is necessary to wind the reinforcing member 12a such that it does not protrude from the end surfaces 10a of the permanent magnets 10; however, if the spacer 50 is provided as in the example illustrated in FIG. 15, the winding operation is facilitated by winding the reinforcing member 12a around the outer peripheral surfaces of the permanent magnets 10 and the spacing members including the outer peripheral surface of the spacer 50.

Moreover, in the present embodiment, the spacer 50 is made of a non-magnetic material; therefore, flux leakage from the end portions of the permanent magnets 10 can be suppressed.

Other configurations, operations, and effects of the present embodiment are similar to those of the first embodiment. The present embodiment can also be applied to the second embodiment. Specifically, in FIG. 8, a spacer can be provided between the end portion 35b and the permanent magnets 10 and another spacer can be further provided between the end portion 35c and the permanent magnets 10. In this case also, an effect similar to that of the present embodiment can be obtained.

Seventh Embodiment.

Figure 16:
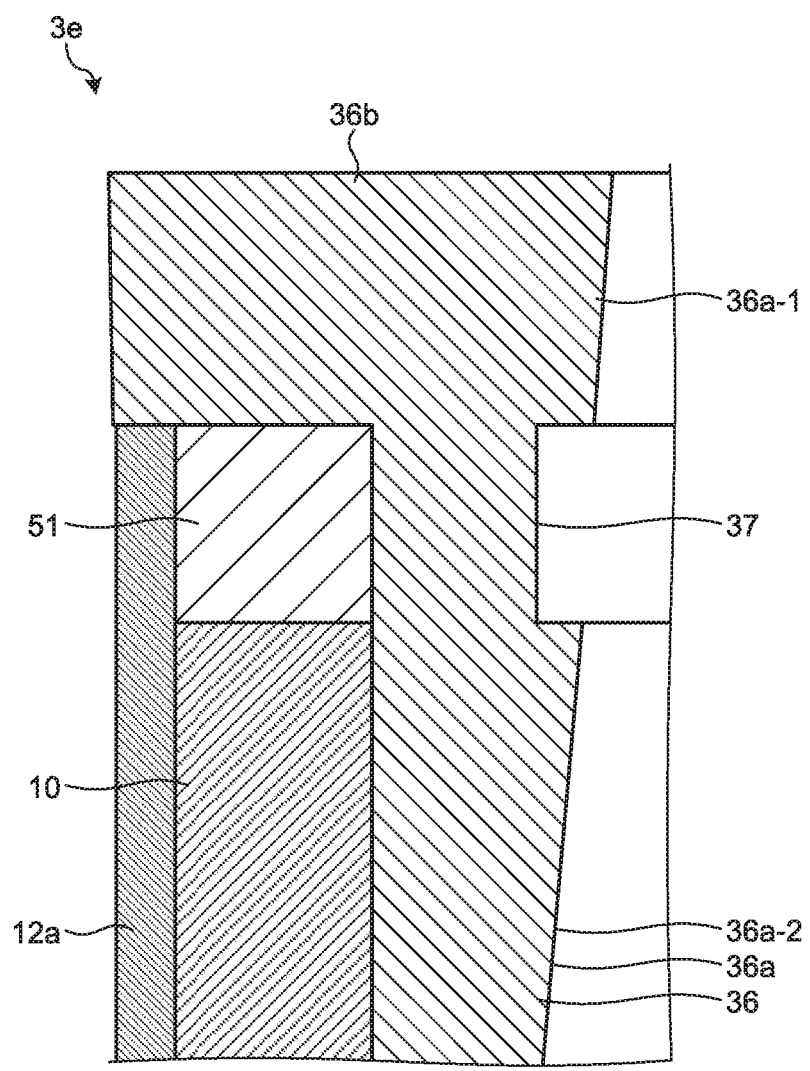
FIG. 16 is a partially enlarged longitudinal cross-sectional view of the configuration of a rotor of a rotary electric machine according to a seventh embodiment.

FIG. 16 is a partially enlarged longitudinal cross-sectional view of the configuration of a rotor of a rotary electric machine according to the present embodiment. In FIG. 16, components identical to those illustrated in FIGS. 9 and 12 are denoted by the same reference numerals.

As illustrated in FIG. 16, a rotor 3e according to the present embodiment includes a spacer 51 between the flange end portion 36b and the permanent magnets 10. The spacer 51 is sandwiched between the end portion 36b and the permanent magnets 10. The spacer 51 is disposed on the outer peripheral surface of the sleeve member 36. The spacer 51 is made of a non-magnetic material. Specifically, the spacer 51 is made of stainless steel, aluminum alloy, copper alloy, iron alloy, or resin.

The spacer 51 is annular and the inner peripheral surface and the outer peripheral surface of the spacer 51 each have a cylindrical surface. The outer diameter of the spacer 51 is equal to the outer diameter of the cylindrical outer peripheral surface formed by the permanent magnets 10 and a plurality of spacing members (not illustrated in FIG. 16). As described in the sixth embodiment, a configuration without the spacing members is also possible. The outer peripheral surface of the end portion 36b has a cylindrical surface and the outer diameter of the end portion 36b is larger than that of the spacer 51.

Moreover, the length of the reinforcing member 12a in the axial direction is larger than the length of the permanent magnets 10 in the axial direction but is shorter than the length of the sleeve member 36 in the axial direction. The reinforcing member 12a also covers the outer peripheral surface of the spacer 51.

In a similar manner to FIG. 12, the inner peripheral surface 36a includes two tapered surfaces 36a-1 and 36a-2, which are formed with the groove 37 therebetween.

In the present embodiment, the spacer 51 is provided between the end portion 36b and the permanent magnets 10; therefore, when the reinforcing member 12a is directly wound around the permanent magnets 10 and the spacing members, it is possible to increase the ease of the winding operation. In other words, if there is no spacer 51, it is necessary to wind the reinforcing member 12a such that it does not protrude from the end surfaces 10a of the permanent magnets 10; however, if the spacer 51 is provided as in the example illustrated in FIG. 16, the winding operation is facilitated by winding the reinforcing member 12a around the outer peripheral surfaces of the permanent magnets 10 and the spacing members including the outer peripheral surface of the spacer 51.

Moreover, in the present embodiment, the spacer 51 is made of a non-magnetic material; therefore, flux leakage from the end portions of the permanent magnets 10 can be suppressed.

Other configurations, operations, and effects of the present embodiment are similar to those of the third and sixth embodiments. The present embodiment can also be applied to the fifth embodiment. Specifically, in FIG. 14, a spacer can be provided between the end portion 45b and the permanent magnets 10 and another spacer can be further provided between the end portion 45c and the permanent magnets 10. In this case also, an effect similar to that of the present embodiment can be obtained.

The configurations illustrated in the embodiments above are examples of the content of the present invention and can be combined with other publicly known technologies and they can be changed, for example, by omitting part thereof without departing from the scope of the present invention.

REFERENCE SIGNS LIST 1 rotary electric machine, 2 stator, 3, 3a, 3b, 3c, 3d, 3e, 101 rotor, 4, 4b, 104 shaft, 5 stator core, 6 coil, 7 power lead, 8 air gap, 9, 35, 36, 39, 45, 109 sleeve member, 9a, 35a, 36a, 39a, 45a, 109a inner peripheral surface, 9a-1, 9a-2, 35a-1, 35a-2, 35a-3, 36a-1, 36a-2, 39a-1, 39a-2 tapered surface, 9b, 9c, 35b, 35c, 36b, 36c, 39b, 45b, 45c, 109b end portion, 10 permanent magnet, 10a, 10b end surface, 11 spacing member, 12, 12a reinforcing member, 15 through hole, 16 hollow, 20 housing, 30, 31, 32, 40, 41 stress, 37, 46a, 46b groove, 50, 51 spacer.

The invention claimed is:

1. A rotor member of a rotary electric machine comprising a tubular sleeve member that includes a first end portion and a second end portion, which are spaced apart from each other in an axial direction, and an inner peripheral surface that forms a through hole that is parallel to the axial direction and through which a shaft passes, wherein the first end portion is a flange portion, an annular groove is formed on the inner peripheral surface in a peripheral direction of the sleeve member such that the groove is adjacent to the first end portion, and the inner peripheral surface includes a tapered surface, an inner diameter of which is intermittently reduced toward the first end portion from the second end portion.

2. The rotor member of a rotary electric machine according to claim 1, wherein the inner peripheral surface excluding the groove is a linear tapered surface having a constant inclination angle with respect to the axial direction.

3. The rotor member of a rotary electric machine according to claim 1, wherein the inner peripheral surface includes two linear tapered surfaces having inclination angles of different and constant magnitudes with respect to the axial direction, the groove being interposed between the two linear tapered surfaces.

4. The rotor member of a rotary electric machine according to claim 1, wherein the second end portion is another flange portion different from the flange portion, another annular groove different from the groove is formed on the inner peripheral surface, and the another annular groove is formed in a peripheral direction of the sleeve member such that the another annular groove is adjacent to the second end portion.

5. The rotor member of a rotary electric machine according to claim 1, wherein a magnitude of an inclination angle of the tapered surface with respect to the axial direction is in a range of 0° to 10°.

6. A rotor member of a rotary electric machine comprising a tubular sleeve member that includes a first end portion and a second end portion, which are spaced apart from each other in an axial direction, and an inner peripheral surface that forms a through hole that is parallel to the axial direction and through which a shaft passes, wherein the first end portion is a flange portion, and the inner peripheral surface includes a first tapered surface, an inner diameter of which is continuously reduced toward the second end portion from the first end portion, and a second tapered surface, an inner diameter of which is continuously reduced toward the first end portion from the second end portion.

7. The rotor member of a rotary electric machine according to claim 6, wherein the first tapered surface is a linear tapered surface having an inclination angle of a constant magnitude with respect to the axial direction, the second tapered surface is a linear tapered surface having an inclination angle of a constant magnitude with respect to the axial direction, and the first tapered surface is connected to the second tapered surface.

8. The rotor member of a rotary electric machine according to claim 6, wherein the second end portion is another flange portion different from the flange portion, the first tapered surface is a linear tapered surface having an inclination angle of a constant magnitude with respect to the axial direction, the second tapered surface is formed by connecting two linear tapered surfaces having inclination angles of different and constant magnitudes with respect to the axial direction, and a magnitude of an inclination angle of a linear tapered surface that is on a second end portion side and is among the two linear tapered surfaces from which the second tapered surface is configured is larger than a magnitude of an inclination angle of a linear tapered surface that is on a first end portion side and is among the two linear tapered surfaces from which the second tapered surface is configured.

9. The rotor member of a rotary electric machine according to claim 6, wherein
an annular groove is formed on the inner peripheral surface in a peripheral direction of the sleeve member such that the groove is adjacent to the first end portion,
the first tapered surface is a linear tapered surface having an inclination angle of a constant magnitude with respect to the axial direction,
the second tapered surface is a linear tapered surface having an inclination angle of a constant magnitude with respect to the axial direction, and
the first tapered surface is connected to the second tapered surface via the groove.

10. The rotor member of a rotary electric machine according to claim 6, wherein
a magnitude of an inclination angle of the first tapered surface with respect to the axial direction is in a range of 0° to 10°, and
a magnitude of an inclination angle of the second tapered surface with respect to the axial direction is in a range of 0° to 10°.

11. The rotor member of a rotary electric machine according to claim 1, wherein, at any point along the axial direction, the sleeve member excluding the first end portion and the second end portion has a thickness in a range of 1 mm to 10 mm.

12. The rotor member of a rotary electric machine according to claim 6, wherein, at any point along the axial direction, the sleeve member excluding the first end portion and the second end portion has a thickness in a range of 1 mm to 10 mm.

13. A rotor of a rotary electric machine comprising:
the rotor member of the rotary electric machine according to claim 1;
a plurality of permanent magnets aligned in a peripheral direction on an outer peripheral surface of the sleeve member; and
a tubular reinforcing member that covers an outer peripheral surface of the permanent magnets.

14. A rotor of a rotary electric machine comprising:
the rotor member of the rotary electric machine according to claim 6;
a plurality of permanent magnets aligned in a peripheral direction on an outer peripheral surface of the sleeve member; and
a tubular reinforcing member that covers an outer peripheral surface of the permanent magnets.

15. The rotor of a rotary electric machine according to claim 13, wherein the groove does not extend in the axial direction beyond a positon of an end surface on a first end portion side of the permanent magnets.

16. The rotor of a rotary electric machine according to claim 14, wherein the first tapered surface does not extend in the axial direction beyond a position of an end surface on a first end portion side of the permanent magnets.

17. The rotor of a rotary electric machine according to claim 13, wherein
a length of the reinforcing member in the axial direction is larger than a length of the permanent magnets in the axial direction,
an annular spacer is disposed between the permanent magnets and the first end portion, and
the reinforcing member covers an outer peripheral surface of the permanent magnets and the spacer.

18. The rotor of a rotary electric machine according to claim 13, wherein the reinforcing member is made of carbon fiber reinforced plastics, glass fiber reinforced plastics, synthetic fiber, titanium, or stainless steel.

19. A rotary electric machine comprising:
an annular stator; and
the rotor according to claim 13 disposed on an inner side of the stator.

* * * * *